United States Patent [19]

Kouno et al.

[11] Patent Number: 4,857,034
[45] Date of Patent: Aug. 15, 1989

[54] HYDRAULIC CONTROL SYSTEM FOR CONTINUOUSLY VARIABLE TRANSMISSION FOR AUTOMOTIVE VEHICLE

[75] Inventors: Katsumi Kouno, Susono; Susumu Okawa, Aichi; Masami Sugaya; Yoshinobu Soga, both of Susono, all of Japan

[73] Assignee: Toyota Jidosha Kabushiki Kaisha, Aichi, Japan

[21] Appl. No.: 16,661

[22] Filed: Feb. 19, 1987

[30] Foreign Application Priority Data

| Feb. 22, 1986 | [JP] | Japan | 61-37571 |
|---|---|---|---|
| Feb. 22, 1986 | [JP] | Japan | 61-37573 |
| Feb. 22, 1986 | [JP] | Japan | 61-37575 |
| Feb. 22, 1986 | [JP] | Japan | 61-37577 |
| Feb. 22, 1986 | [JP] | Japan | 61-37578 |
| Feb. 22, 1986 | [JP] | Japan | 61-37579 |
| Feb. 22, 1986 | [JP] | Japan | 61-37580 |
| Feb. 22, 1986 | [JP] | Japan | 61-37581 |

[51] Int. Cl.⁴ ............................................. F16H 11/04
[52] U.S. Cl. ............................................. 474/28; 74/869
[58] Field of Search ............................... 474/28, 18; 74/867–869

[56] References Cited

U.S. PATENT DOCUMENTS

| 3,600,960 | 8/1971 | Karig | 474/12 |
|---|---|---|---|
| 4,152,947 | 5/1979 | van Deursen et al. | 474/11 |
| 4,403,975 | 9/1983 | Rattunde | 474/18 |
| 4,475,416 | 10/1984 | Underwood | 474/28 |
| 4,669,336 | 6/1987 | Okada et al. | 474/28 |

FOREIGN PATENT DOCUMENTS

| 0063786 | 11/1982 | European Pat. Off. |
| 0151535 | 8/1985 | European Pat. Off. |
| 0168540 | 1/1986 | European Pat. Off. |
| 52-98861 | 8/1977 | Japan |
| 58-29424 | 6/1983 | Japan |

*Primary Examiner*—Thuy M. Bui
*Attorney, Agent, or Firm*—Parkhurst, Oliff & Berridge

[57] ABSTRACT

A hydraulic control system for a continuously variable transmission for an automotive vehicle, the transmission having a first and a second variable-diameter pulley provided on respective first and second shafts, a belt connecting the first and second pulleys, and a first and a second hydraulic cylinder for changing effective diameters of the first and second pulleys. The control system includes a first pressure regulating valve for regulating the pressure of a fluid delivered from a pressure source, and thereby establishing a first line pressure, a shift-control valve for applying the first line pressure to one of the first and second cylinders, while simultaneously permitting a flow of the fluid from the other cylinder, thereby changing the effective diameters of the first and second pulleys, and a second pressure regulating valve for regulating the pressure of a discharge flow of the fluid flowing from the above-indicated other cylinder through the shift-control valve, and thereby establishing a second line pressure lower than the first line pressure.

27 Claims, 25 Drawing Sheets

HYDRAULIC CONTROL SYSTEM FOR CONTINUOUSLY VARIABLE TRANSMISSION FOR AUTOMOTIVE VEHICLE

BACKGROUND OF THE INVENTION

1. Field of the Invention

The present invention relates to improvements in a hydraulic control system for a continuously variable transmission of a belt-and-pulley type for an automotive vehicle.

Discussion Of The Related Art

A belt-and-pulley type of continuously variable transmission for an automotive vehicle is known. This transmission includes a first shaft, a second shaft, a first variable-diameter pulley provided on the first shaft, a second variable-diameter pulley provided on the second shaft, a transmission belt connecting the first and second pulleys to transmit power from the first shaft to the second shaft, a first hydraulic cylinder for changing an effective diameter of the first pulley, and a second hydraulic cylinder for changing an effective diameter of the second pulley. An example of a hydraulic control system for this type of continuously variable transmission is disclosed in Laid-open publication No. 52-98861 (published in 1977) of Japanese Patent Application corresponding to U.S. Pat. No. 4,403,975, wherein the belt tension is adjusted primarily by regulating the pressure of a flow of a working fluid supplied to the second hydraulic cylinder (provided on the second or driven shaft), whereas the speed ratio of the transmission is controlled primarily by regulating the pressure of a flow of the fluid supplied to or discharged from the first hydraulic cylinder (provided on the first or drive shaft).

In such a hydraulic control system, a single line pressure regulated in relation to the speed ratio of the transmission is provided to activate the second hydraulic cylinder primarily for maintaining a suitable tension of the transmission belt. The line pressure is also applied to the first hydraulic cylinder, via a flow control valve which functions to control the speed ratio of the transmission. In this arrangement, the rates of flow of the fluid to and from the first cylinder change with the line pressure, that is, with the speed ratio of the transmission. Therefore, it is inevitable that the rate at which the speed ratio is changed is affected by the specific current speed ratio. Accordingly, the above-indicated hydraulic control system tends to fail to provide a sufficient response in the control of the speed ratio, while the transmission is in a transient condition, that is, operating at a changing speed ratio. Further, when the direction of power transmission is reversed due to an engine braking effect, the belt tension is primarily controlled by the first cylinder while the speed ratio is regulated by the second cylinder, whereby the belt tension and the speed ratio cannot be suitably controlled.

Another hydraulic control system for a continuously variable transmission is disclosed in Publication No. 58-29424 (published in 1983 for opposition purpose) of Japanese Patent Application corresponding to U.S. Pat. No. 4,403,975, wherein a control valve (four-way valve) is used to change the speed ratio of the transmission by feeding a working fluid from a hydraulic source to one of the two hydraulic cylinders, and at the same time allowing the fluid to be discharged from the other cylinder. The control system further uses an electromagnetic relief valve for regulating the pressure of the fluid which is delivered from the control valve.

In the hydraulic control system indicated above, a comparatively high pressure is applied to the hydraulic cylinder for the pulley provided on the drive shaft, i.e., to one of the two cylinders which is subject to a relatively high pressure due to power transmission in the direction from the drive shaft to the driven shaft of the transmission. The other cylinder is supplied with the pressure which is regulated by the electromagnetic relief valve. According to this arrangement, the belt tension and the speed ratio of the transmission can be suitably controlled, even when the direction of power transmission is reversed.

Problems Solved by the Invention

In the conventional continuously variable transmission, however, the pressure of the fluid delivered by the hydraulic source is not regulated, but is merely maintained at a predetermined level by an ordinary pressure relief valve. Hence, the rate of change in the speed ratio or the shifting response of the transmission may have relatively large variations, due to changes in the fluid pressure levels within the hydraulic cylinders according to a change in the torque transmitted by the transmission and a change in the speed ratio of the transmission. It is possible to set the pressure of the hydraulic source at a level high enough to permit a sufficiently high rate of change in the speed ratio over the entire operating range of the transmission. In this case, however, the system suffers from increased power loss due to maintenance of the high pressure throughout the operation of the transmission.

SUMMARY OF THE INVENTION

It is accordingly an object of the present invention to provide a hydraulic control system for a continuously variable transmission for an automotive vehicle, which permits an excellent shifting response, and minimum loss of power for operating the transmission.

The above object may be achieved according to the present invention, which provides a hydraulic control system for a continuously variable transmission of a belt-and-pulley type for an automotive vehicle, the transmission having a first and a second shaft, a first and a second variable-diameter pulley provided on the first and second shafts, respectively, a transmission belt connecting the first and second pulleys to transmit power from one of the pulleys to the other, and a first and a second hydraulic cylinder for changing effective diameters of the first and second pulleys, the hydraulic control system comprising a hydraulic pressure source for pressurizing a working fluid, a first pressure regulating valve, a shift-control valve, and a second pressure regulating valve. The first pressure regulating valve is adapted to regulate the pressure of the pressurized fluid delivered from the hydraulic pressure source, thereby establishing a first line pressure. The shift-control valve applies the first line pressure to one of the first and second hydraulic cylinders, while simultaneously permitting a flow of the fluid from the other hydraulic cylinder, thereby changing the effective diameters of the first and second pulleys to control a speed ratio of the transmission. The second pressure regulating valve is adapted to regulate the pressure of a discharge flow of the fluid flowing from the above-indicated other hydraulic cylinders through the shift-control valve, and to thereby establish a second line pressure which is lower than the first line pressure.

In the hydraulic control system of the present invention arranged as described above, the first and second line pressures are prepared by the first and second pressure regulating valves. In this arrangement, a difference between the first and second line pressures determines a rate of flow of the fluid to be fed into one of the first and second hydraulic cylinders, or a rate of flow of the fluid to be discharged from the other hydraulic cylinder. Therefore, the rate at which the speed ratio of the transmission is changed, is solely determined by the difference between the first and second line pressures, irrespective of the current speed ratio of the transmission. Accordingly, the transmission can be shifted with an improved response to required changes in the speed ratio.

Further, the first line pressure may be controlled in relation to the current engine output of the vehicle, so that the first line pressure is optimum, i.e., maintained at a required minimum level, for permitting a sufficiently high rate of change in the speed ratio, while minimizing a power loss of the hydraulic pressure source. On the other hand, the second line pressure may be controlled in relation to the current speed ratio and transmission torque, so that the second line pressure is maintained at a required minimum level, so as to give a suitable amount of tension to the belt, enabling the transmission to operate without a slip of the belt on the pulleys. Thus, the instant hydraulic control system provides an advantage of minimizing the power loss of the vehicle due to the use of unnecessarily high pressure for activating the cylinders.

The first and second line pressures are determined so that a desired speed ratio of the transmission and a desired tension of the transmission belt may be obtained at the same time. Preferably, the second line pressure is calculated based on a desired or target pressure in the hydraulic cylinder on the driven shaft, and a compensation value. The target cylinder pressure is determined based on variables such as the actual speed ratio of the transmission, and an output torque of an engine of the vehicle. The compensation value is determined based on the actual speed ratio of the transmission, an output torque of the engine, and a target speed ratio of the transmission. The first line pressure is calculated based on a desired pressure in the hydraulic cylinder on the drive shaft, and on the compensation value. The desired cylinder pressure is determined by a thrust ratio of the first and second cylinders, which is determined based on the target speed ratio of the transmission and on the output torque of the engine.

According to one advantageous feature of the invention, the shift-control valve includes a cylinder body having a cylinder bore, a valve spool slidably received within the cylinder bore, biasing means for normally holding the valve spool in its neutral position, and an electromagnetic actuator operable for moving the valve spool away from the neutral position. The cylinder body further has a first and a second output port which communicates with the cylinder bore, and with the first and second hydraulic cylinders, respectively, an input port which communicates with the cylinder bore and receives the first line pressure, and a drain port communicating with the cylinder bore. While the valve spool is placed in its neutral position, the valve spool permits restricted equal flows of the fluid between the first and second output ports, and the input and drain ports, with slight areas of communication therebetween. A movement of the valve spool from the neutral position in an axial direction thereof causing an increase in an area of communication between one of the first and second output ports and the input port, a decrease in an area of communication between that one output port and the drain port, a decrease in an area of communication between the other output port and the input port, and an increase in an area of communication between the other output port and the drain port.

In the shift-control valve constructed as described above, the valve spool is directly actuated by the electromagnetic actuator. This is contrary to a conventional type of shift-control valve which is actuated indirectly by an axially movable rotor of a variable-diameter pulley, through a suitable linkage which is connected at one end to a suitable member to move the valve spool, and which is held at the other end in sliding contact with the movable rotor. This conventional shift-control valve is affected by the specifications of the link mechanism. However, the output characteristics of the shift-control valve according to the invention described above is not influenced by such a link mechanism. Thus, the instant shift-control valve has an improved control freedom. Further, since the shift-control valve is not operatively connected to the variable-diameter pulley through a linkage, the valve has also an improved freedom in its location relative to the pulley. In addition, the elimination of a link mechanism leads to a freedom from control inaccuracy which may arise from an accumulative positional error inherent in the link mechanism.

According to another advantageous feature of the invention, the shift-control valve has a valve spool, and the hydraulic control system further comprises a pilot pressure source for generating a pilot pressure for operating the valve spool of the shift-control valve, and a solenoid-operated valve device operable for controlling a level of the pilot pressure to be applied to the valve spool, and thereby controlling a position of the valve spool. In one preferred form of the above arrangement, the shift-control valve includes a cylinder body having a cylinder bore in which the valve spool is slidably received. The cylinder body cooperates with pressure-receiving surfaces of the valve spool at opposite axial ends thereof, to define a first and a second pilot pressure chamber which are fluid-tightly formed at opposite ends of the cylinder bore. The first and second pilot pressure chambers are adapted to receive the pilot pressure so that the pilot pressure acts on the pressure-receiving surfaces of the valve spool. The solenoid-operated pilot valve device is turned on and off with a controlled duty cycle to control the level of the pilot pressure to be supplied to the first and second pilot pressure chambers. In another preferred form of the above arrangement, the pilot pressure source comprises a pressure relief valve and a flow restrictor in series connection with the pressure relief valve. The pressure relief valve and the flow restrictor are disposed between a drain line, and one of a first and a second pressure line from which the first and second line pressures are obtained. The pilot pressure is produced from between the pressure relief valve and the flow restrictor. In an alternative preferred form, the pilot pressure source comprises a third pressure regulating valve disposed in a line into which the fluid flows from one of the first and second pressure regulating valves. The third pressure regulating valve is adapted to regulate a pressure of the fluid flowing from the one of the first and second pressure regulating valves, as the pilot pressure.

In the hydraulic control system according to the above advantageous feature of the invention as described above, the output pressures of the shift-control valve are changed, with the valve spool being moved directly by the pilot pressure which is controlled by the solenoid-operated pilot valve device. Thus, no link mechanism as previously indicated is provided for operating the valve spool, and the present control system enjoys the same advantages as described before, as compared with an arrangement which uses a linkage for operative connection of the shift-control valve to a movable rotor of a pulley. Further, the present arrangement assures a stable shifting operation of the transmission, since the valve spool is operated by the pilot pressure which is produced by the pilot pressure source and controlled by the pilot valve device. This is contrary to an arrangement wherein a valve spool is subjected to a first or second line pressure under the control of a solenoid-operated pilot valve, which line pressure is varied in relation to the speed ratio of the transmission, and a torque transmitted by the transmission. In this latter arrangement, a variation in the first or second line pressure causes a variation in the shifting speed of the valve spool and consequently a variation in the shifting speed of the transmission.

According to a further advantageous feature of the present invention, the shift-control valve includes a valve body having a pair of cylinder bores, a pair of valve spools axially slidably received within the cylinder bores, respectively, a pair of stop members for limiting axial movements of the valve spools through abutting contact with the valve spools, respectively, and thereby determining neutral positions of the valve spools, and actuator means for axially moving the valve spools, and thereby controlling flows of the fluid into the one hydraulic cylinder and from the other hydraulic cylinder.

In the shift-control valve described above, each valve spool is exactly located at its neutral position through abutment on the stationary stop member, which limits the axial movement of the spool in the biasing direction of the spring. In other words, the neutral position of the valve spool is determined more exactly with a reduced fluctuation, than in a shift-control valve wherein a valve spool is operated via a link mechanism and suffers from a comparatively large fluctuation in its neutral position due to an accumulative error of the link mechanism. According to the present arrangement according to the invention, it is not necessary to adjust the neutral position of the valve spools during assembling of the hydraulic system. Further, the present arrangement is almost free of a fluctuation in the neutral position of the valve spools due to contamination of the working fluid with foreign substances, or a change in the sliding resistance of the spools. Such a fluctuation is comparatively large in a shift-control valve wherein the neutral position of a spool is determined by an equilibrium point of the biasing forces of two springs which bias the spool in opposite axial directions. Another advantage of the shift-control valve according to the above-described feature of the invention is derived from the use of two valve spools, which makes it possible to reduce the lengths of each spool and the corresponding cylinder bore, and thus makes it easier to machine the spools and bores, than in a case where a single spool is used.

In one preferred form of the above feature of the invention, the actuator means comprises a pair of springs for biasing the pair of valve spools axially toward the stop members, a pair of cores fixedly engaging the pair of valve spools, and a pair of coils disposed around the pair of cores to produce electromagnetic forces to move the cores and thereby directly move the pair of valve spools against the biasing action of the pair of springs. According to this arrangement, the valve spools may be operated by comparatively large drive forces.

In an alternative preferred form of the same feature of the invention, the hydraulic control system further comprises a pilot pressure source for generating a pilot pressure applied to the pair of valve spools, and the actuator means comprises a pair of springs for biasing the pair of valve spools axially toward the stop members, and a pair of solenoid-operated pilot valves for controlling the pilot pressure and thereby controlling the axial movements of the valve spools against the biasing action of the pair of springs. According to this arrangement, the valve spools may be driven with a comparatively reduced electric power.

In another preferred form of the above feature of the invention, one of the pair of valve spools is adapted to permit a flow of the fluid into the first hydraulic cylinder, and a flow of the fluid from the second hydraulic cylinder. The other valve spool is adapted to permit a flow of the fluid into the second hydraulic cylinder and a flow of the fluid from the first hydraulic cylinder. This arrangement is preferred where the first shaft is connected to an engine of the vehicle.

According to a still further advantageous feature of the present invention, the shift-control valve includes a valve body having four parallel cylinder bores, four valve spools axially slidably received within the cylinder bores, respectively, four stop members for limiting axial movements of the valve spools through abutting contact with the valve spools, respectively, and thereby determining neutral positions of the valve spools, and actuator means for axially moving the valve spools, and thereby controlling flows of the fluid into the one hydraulic cylinder and from the other hydraulic cylinder.

In the shift-control valve described above, each of the four valve spools is exactly located at its neutral position through abutment on the stationary stop member, which limits the axial movement of the spool in the biasing direction of the corresponding spring. In other words, the neutral position of the valve spool is determined more exactly with a reduced fluctuation, than in a shift-control valve wherein a valve spool is operated via a link mechanism and suffers from a comparatively large fluctuation in its neutral position due to an accumulative error of the link mechanism. According to the present arrangement according to the invention, it is not necessary to adjust the neutral position of the valve spools during assembling of the hydraulic system. Further, the present arrangement is almost free of a fluctuation in the neutral position of the valve spools due to contamination of the working fluid with foreign substances, or a change in the sliding resistance of the spools. Such a fluctuation is comparatively large in a shift-control valve wherein the neutral position of a spool is determined by an equilibrium point of the biasing forces of two springs which bias the spool in opposite axial directions. Another advantage of the shift-control valve according to the above-described feature of the invention is derived from the use of four valve spools, which makes it possible to reduce the lengths of each spool and the corresponding cylinder bore, and thus makes it easier and economical to machine the spools and bores with high out-of roundness and cylindricity, than in a case where a shift-control valve uses a single spool. Furthermore, the four valve spools in place of a single relatively long valve spool makes it possible to adapt the body of the shift-control valve to the surrounding components, and to reduce the size of the valve body.

In one preferred form of the above feature of the invention, the four valve spools consist of a first spool for permitting a flow of the fluid to the first hydraulic cylinder, a second spool for permitting a flow of the fluid from the first hydraulic cylinder, a third spool for permitting a flow of the fluid to the second hydraulic cylinder, and a fourth spool for permitting a flow of the fluid from the second hydraulic cylinder.

In another preferred form of the same feature of the invention, the hydraulic control system further comprises a pilot pressure source for generating a pilot pressure applied to the four valve spools, and the actuator means comprises four springs for biasing the pair of valve spools axially toward the stop members, and a pair of solenoid-operated pilot valves for controlling the pilot pressure and thereby controlling the axial movements of the valve spools against the biasing action of the four springs. In this instance, the valve spools may be driven with a comparatively small electric power. In one arrangement of this form of the invention, each of the four spools is exposed at opposite axial ends to the pilot pressure. One of the two pilot valves is adapted to concurrently control the pilot pressures which act on the first and fourth spools in a biasing direction of the corresponding springs. The other pilot valve is adapted to concurrently control the pilot pressures which act on the second and third spools in a biasing direction of the corresponding springs.

According to a yet further advantageous feature of the present invention, the hydraulic control system further comprises a second pressure line from which the second line pressure is obtained, and a reference pressure line connected to the second pressure line, and the first pressure regulating valve comprises a reference pressure port which is connected to the reference pressure line to receive the second line pressure as a reference pressure on which the first line pressure is regulated by the first pressure regulating valve.

In the above arrangement, the second line pressure is applied through the reference pressure line to the reference pressure port of the first pressure regulating valve, so that the first line pressure is regulated by the first pressure regulating valve, based on the second line pressure. In this case, solenoid-operated proportional pressure relief valves of the same capacity and specifications may be used as the first and second pressure regulating valves. Alternatively, the above arrangement permits the first and second pressure regulating valves to be provided in the form of spool valves that are adapted to provide a suitable differential between the first and second line pressures, without any external control signals.

According to the above arrangement, the first and second line pressures are determined so as to provide desired speed ratio and belt tension of the transmission at the same time. Preferably, the second line pressure is calculated based on a target or desired pressure in the corresponding hydraulic cylinder, an actual speed ratio and a target speed ratio of the transmission, an output torque of the vehicle engine, and a compensation value determined by the target speed ratio. The desired cylinder pressure is determined based on the transmission speed ratio and the engine output torque. Further, the first line pressure is calculated based on a desired pressure in the corresponding hydraulic cylinder and a compensation value. The desired cylinder pressure is determined based on a thrust ratio of the first and second cylinders, which is determined by the target transmission speed ratio and the engine output torque. The first pressure regulating valve is operated so as to produce a suitable difference between the first and second line pressures.

In one preferred form of the above feature of the invention, the hydraulic control system further comprises a first pressure line from which the first line pressure is obtained, and further comprises a pilot line provided with a flow restrictor and connected to the first pressure line. Further, the first pressure regulating valve includes a solenoid-operated linear pilot valve connected between the pilot line and the reference pressure line, to receive the fluid from the first pressure line through the flow restrictor and release a portion of the received fluid into the reference pressure line through the reference pressure port, thereby producing a continuously variable pilot pressure between the pilot valve and the flow restrictor. The first pressure regulating valve further includes a valve spool operable between a closed position, and an open position for fluid communication of the first pressure line with the second pressure line or a drain line. The pilot pressure acts on the valve spool to move the valve spool in a direction toward the closed position.

In an alternative preferred form according to the same feature of the invention, the first pressure regulating valve includes a valve spool operable between a closed position, and an open position for fluid communication between the first pressure line with the second pressure line or a drain line. The valve spool has a first and a second pressure receiving surface. The first line pressure acts on the first pressure receiving surface of the valve spool in a direction to move the valve spool toward the open position, while the second line pressure supplied through the reference pressure line acts on the second pressure receiving surface of the valve spool in a direction to move the valve spool toward the closed position. The valve spool is biased by a spring in a direction toward the closed position.

In accordance with still another advantageous feature of the present invention, the hydraulic control system further comprises a first and a second pressure line from which the first and second line pressures are obtained, respectively. Further, the first pressure regulating valve includes a valve spool operable between a closed position, and an open position for fluid communication of the first pressure line with the second pressure line or a drain line. The valve spool has a first and a second pressure receiving surface which have different areas. The first line pressure acts on the first pressure receiving surface of the valve spool in a direction to move the valve spool toward the open position. The second line pressure supplied through the second pressure line acts on the second pressure receiving surface of the valve spool in a direction to move the valve spool toward the closed position. Thus, the first pressure regulating valve is operable to release a portion of the fluid received from the hydraulic pressure source through the first pressure line, into the second pressure line, thereby producing the second line pressure in the second pressure line.

Since the first and second pressure receiving surfaces of the valve spool which receive the first and second line pressures have different areas in the first pressure regulating valve, the first line pressure can be regulated to be a higher than the pressure in the high-pressure cylinder (provided on the drive shaft of the transmission), by an optimum value, that is, by a required minimum. Hence, the instant first pressure regulating valve is effective in minimizing the power loss of the hydraulic 0 system due to an unnecessarily large surplus of the first line pressure. Further, this pressure regulating valve is hydraulically operated, and no electric control as required on a solenoid-operated relief valve is required. Accordingly, the control system can be made relatively simple.

In one preferred form of the above feature of the hydraulic control system, the first pressure regulating valve further includes a spring which biases the valve spool in a direction toward the closed position. Preferably, the second pressure receiving surface of the valve spool of the first pressure regulating valve has a smaller area than the first pressure receiving surface.

According to yet another advantageous feature of the invention, the hydraulic control system further comprises a first and a second pressure line from which the first and second line pressures are obtained, respectively. The shift-control valve is adapted such that an area of flow of the fluid through the shift-control valve in a direction from each of the first and second hydraulic cylinders toward the second pressure line is larger than an area of flow of the fluid through the shift-control valve in a direction from the first pressure line toward the each hydraulic cylinder, at least while the shift-control valve is placed in a neutral position thereof. According to the above arrangement, the shift-control valve has a larger area of fluid flow in the direction from each cylinder toward the second pressure line, than in the direction from the cylinder toward the first pressure line, while the valve is in its neutral position. Therefore, the output pressures of the shift-control valve is governed by the second line pressure, and the pressure in the low-pressure cylinder which determines the tension of the transmission belt can be adjusted by regulating the second line pressure. As the shift-control valve is operated from its neutral position, the area of flow of the fluid from the cylinder into the second pressure line is decreased and eventually zeroed, while the pressure delivered to the cylinder is accordingly raised at a sufficiently high rate. Thus, a control error of the shift-control valve is significantly reduced, as compared with that in a shift-control valve using flow restrictors.

In one preferred form of the above feature of the invention, the shift-control valve includes a valve body having a cylinder bore 66, and a valve spool slidably received within the cylinder bore and having two lands. The valve body and the valve spool are constructed such that while in the neutral position of the spool, one of the two lands and the cylinder bore cooperate to define a first clearance communicating with the first pressure line, and a second clearance communicating with the second pressure line, and the other of the two lands and the cylinder bore cooperate to define a third clearance communicating with the first pressure line, and a fourth clearance communicating with the second pressure line. In this case, the second and fourth clearances is larger than the first and third clearances, respectively.

In another preferred form of the same feature of the invention, the cylinder bore and having a first, a second and a third land, the first land being disposed between the second and third lands. The cylinder body and the spool are constructed such that while in the neutral position of the spool, the first and second lands and the cylinder bore cooperate to define a first clearance communicating with the first pressure line, and a second clearance communicating with the second pressure line, and the first and third lands and the cylinder bore cooperate to define a third clearance communicating with the first pressure line, and a fourth clearance communicating with the second pressure line. In this instance, the second and fourth clearances are larger than the first and third clearances, respectively.

In accordance with still another advantageous feature of this invention, the shift-control valve is constructed such that a rate of change in an area of fluid flow through the shift-control valve in a first direction from the first pressure line toward each of the first and second hydraulic cylinders as the shift-control valve is operated from a neutral position thereof, is higher than a rate of change in an area of fluid flow through the shift-control valve in a second direction from each hydraulic cylinder toward the second pressure line. In this arrangement, the area of fluid flow through the valve in the first direction toward the cylinder is increased or decreased at a higher rate, than the rate at which area of fluid flow through the valve so as to discharge the fluid from the same cylinder is changed, as the shift-control valve is operated from its neutral position. Consequently, the pressure in the high-pressure cylinder can be increased comparatively rapidly, or an amount of increase in the cylinder pressure per a given amount of operation of the valve can be made comparatively large, whereby the speed-ratio control error of the shift-control valve is minimized.

In one preferred form of the above feature of the invention, the shift-control valve includes a valve body having a cylinder bore, and a valve spool which is slidably received within the cylinder bore and has a plurality of lands. Each of the lands has a first portion which cooperate with the cylinder bore to define a first clearance through which the fluid flows from the each hydraulic cylinder to the second pressure line, and a second portion which cooperates with the cylinder bore to define a second clearance through which the fluid flows from the first pressure line to the each hydraulic cylinder. The first portion of the each land has a smaller cross sectional area, than the second portion. This difference in the cross sectional area may be given by forming the second portion with a larger diameter than the first portion, or alternatively, forming a notch in the first portion.

In another preferred form of the above feature, the area of fluid flow through the shift-control valve in the second direction is larger than the area of fluid flow through the shift-control valve in the first direction, while the shift-control valve is placed in its neutral position. In this case, the output pressure delivered from the shift-control valve to the cylinder is governed by the second line pressure, even when the shift-control valve is placed in its neutral position. Therefore, the belt tension of the transmission can be adjusted by regulating the second line pressure by the second pressure regulating valve. In one arrangement of this form of the invention, the valve spool of the valve has a plurality of lands, each of the lands cooperating with the cylinder bore to define a first clearance communicating with the first pressure line, and a second clearance communicating with the second pressure line. The cylinder bore and the lands of the valve spools are constructed so that the second clearance is larger than the first clearance while the valve spool is in the neutral position.

BRIEF DESCRIPTION OF THE DRAWINGS

The above and optional objects, features and advantages of the present invention will become more apparent by reading the following detailed description of preferred embodiments of the invention, when considered in connection with the accompanying drawings, in which.

DETAILED DESCRIPTION OF THE PREFERRED EMBODIMENTS

The preferred embodiments of the present invention will be described in detail.

Figure 1:
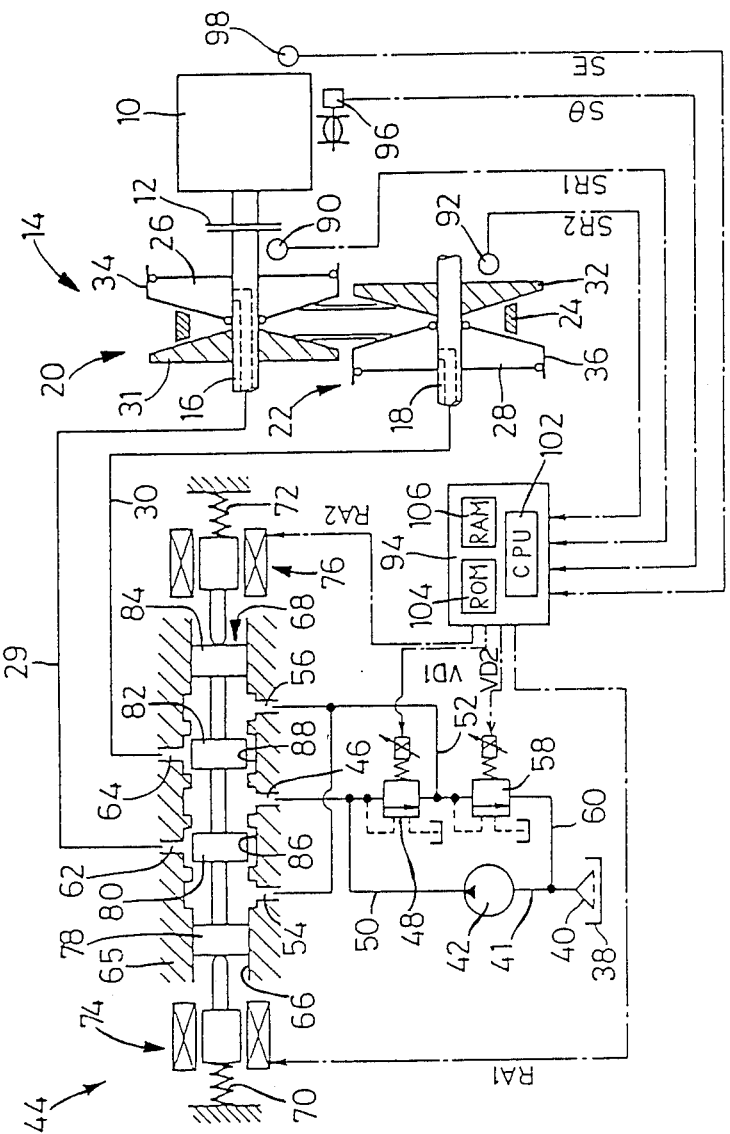
FIG. 1 is a schematic view showing an arrangement of one embodiment of, a hydraulic control system of the present invention for controlling a continuously variable transmission

Referring first to FIG. 1, there is shown a hydraulic control system for a continuously variable transmission 14 of a belt-and-pulley type for an automotive vehicle. The transmission 14 includes a first shaft 16 to which an output of an engine 10 of the vehicle is transmitted via a clutch 12.

The continuously variable transmission 14 including the first shaft 16 further includes a second shaft 18, a first variable-diameter pulley 20 provided on the first shaft 16, a second variable-diameter pulley 22 provided on the second shaft 18, a belt 24 connecting the first and second pulleys 20, 22 to transmit power between the first and second shafts 16, 18, a first hydraulic cylinder 26 for changing an effective diameter of the first pulley 20, and a second hydraulic cylinder 28 for changing an effective diameter of the second pulley 22. These first and second hydraulic cylinders 26 and 28 have the same pressure-receiving areas, and the first and second pulleys 20 and 22 have the same size, so that the continuously variable transmission 14 as a whole is relatively small-sized. The first pulley 20 has an axially stationary rotor 31 fixed to the first shaft 16, and an axially movable rotor 34 which is axially movable on the first shaft 16, cooperating with the stationary rotor 31 to form therebetween a V-groove having a variable width. Similarly, the second pulley 22 has an axially stationary rotor 32 and an axially movable rotor 36, which are provided on the second shaft 18 so as to form therebetween a variable-width V-groove.

An output of the second shaft 18 of the continuously variable transmission 14 is transmitted to drive wheels of the vehicle, via an auxiliary transmission, a differential gear, and other units, all of which are not shown.

The thus constructed power transmission system of the vehicle is operated by a hydraulic control system, which is arranged as described below. The hydraulic control system uses an oil reservoir 38 to which a working fluid is returned. The fluid in the reservoir 38 is pumped up by an oil pump 42 via a strainer 40 and a suction line 41. The thus pressurized fluid is fed to a first pressure line 50, which is connected to an input port 46 of a shift-control valve 44, and to a first pressure regulating valve 48. In the present embodiment of the hydraulic control system, the oil pump 42 constitutes a hydraulic power source, and is driven by the engine 10 via a drive shaft not shown. The first pressure regulating valve 48 is operated in response to a first VALVE DRIVE signal VD1 (which will be described), to release a portion of the fluid in the first pressure line 50, into a second pressure line 52, and thereby regulate a first line pressure Pl1 in the first pressure line 50. The second pressure line 52 is connected to a first and a second drain port 54, 56 of the shift-control valve 44, and to a second pressure regulating valve 58. This second pressure regulating valve 58 is operated in response to a second VALVE DRIVE signal VD2 (which will be described), to release a portion of the fluid in the second pressure line 52, into a drain line 60, and thereby regulate a second line pressure Pl2 in the second pressure line 52, so that the second line pressure Pl2 is lower than the first line pressure Pl1. The first and second pressure regulating valves 48, 58 are each constituted by a so-called solenoid-operated proportional relief valve.

The shift-control valve 44 is a so-called solenoid-operated proportional control valve, which includes a valve body 65 having: the input port 46; the first and second drain ports 54, 56 connected to each other and to the second pressure line 52; a first output port 62 connected to the first cylinder 26 via a conduit 29; a second output port 64 connected to the second cylinder 28 via a conduit 30; and a cylinder bore 66 which communicates with all of these ports 46, 54, 56, 62 and 64. The shift-control valve 44 further includes: a valve spool 68 slidably received in the cylinder bore 66; a first spring 70 and a second spring 72 which are disposed at opposite ends of the valve spool 68, to bias the spool 68 in opposite directions toward a neutral position of the spool 68, thus holding the spool 68 in its neutral position; and a first and a second solenoid 74, 76 which are disposed at the opposite ends of the valve spool 68, to move the spool 68 against the biasing action of the second or first spring 72, 70. The valve spool 68 has formed thereon four lands 78, 80, 82 and 84, which are disposed in the order of description from the end of the spool 68 on the side of the first spring 70. The two intermediate lands 80, 82 are formed such that the lands 80, 82 are aligned with the first and second output ports 62, 64, respectively, in the longitudinal direction of the spool 68, when the spool 68 is placed in its neutral position. The inner surface of the cylinder bore 66 is formed with a first and a second annular groove 86, 88 which are opposite to the intermediate lands 80, 82, respectively, when the spool 68 is placed in its neutral position. In other words, the first and second annular grooves 86, 88 are formed in the spaced-apart portions of the inner surface of the cylinder bore 66, in which the first and second output ports 62, 64 are open. The first and second annular grooves 86, 88 have a width larger than that of the first and second output ports 62, 64, and cooperate with the intermediate lands 80, 82 to form variable flow restrictors which have a continuously variable area of flow of the fluid therethrough.

While the valve spool 68 is placed in the neutral position, the first and second output ports 62, 64 are held in communication with the input port 46, and with the first and second drain ports 54, 56, with a relatively small equal area of communication. Namely, the first and second hydraulic cylinders 26, 28 are supplied with small flows of the fluid from the first and second output ports 62, 64, in order to compensate for leakage flows of the fluid from the cylinders 26, 28. At the same time, small flows of the fluid are discharged from the first and second drain ports 54, 56.

As the valve spool 68 is moved from its neutral position in one of the longitudinal directions, for example, toward the second solenoid 76 (in the right direction as viewed in FIG. 1), the area of communication between the first output port 62 and the first drain port 54 continuously increases, while the area of communication between the second output port 64 and the input port 46 continuously increases. Consequently, the pressure of the fluid to be applied from the first output port 62 to the first cylinder 26 is made lower than that of the fluid to be applied from the second output port 64 to the second cylinder 28. As a result, the equilibrium in the thrust between the first and second cylinders 26, 28 of the transmission 14 is gradually lost, whereby the fluid from the second output port 64 flows into the second cylinder 28, whereas the fluid in the first cylinder 26 is discharged. Thus, the speed ratio e of the transmission 14 (e = Nout/Nin, where Nout: speed of the second shaft 18, Nin: speed of the first shaft 16) is decreased.

Conversely, as the valve spool 68 is moved from the neutral position toward the first solenoid 74 (in the left direction in FIG. 1), the area of communication between the first output port 62 and the input port 46 increases, while the area of communication between the second output port 64 and the second drain port 56 increases. Consequently, the pressure of the fluid to be applied from the first output port 62 to the first cylinder 26 is made higher than that of the fluid to be applied from the second output port 64 to the second cylinder 28. Consequently, the equilibrium in the thrust between the two cylinders 26, 28 is gradually lost, and the fluid is discharged from the second cylinder 28, whereas the fluid flows into the first cylinder 26. As a result, the speed ratio e of the transmission 14 is increased. As described above, the shift-control valve 44 has not only a function of a directional control valve capable of applying a relatively high fluid pressure to one of the cylinders 26, 28 and a relatively low fluid pressure to the other cylinder (i.e., for changing the directions of flow of the fluid to and from the cylinders), but also a function of a flow control valve capable of continuously adjusting rates of flow of the fluid to and from the cylinders 26, 28.

The continuously variable transmission 14 has a first speed sensor 90 for detecting the rotating speed Nin of the first shaft 16, and a second speed sensor 92 for detecting the rotating speed Nout of the second shaft 18. The first and second speed sensors 90, 92 produce first and second ROTATION signals SR1 and SR2 indicative of the rotating speeds Nin and Nout, respectively, which signals SR1 and SR2 are applied to a controller 94. Further, the engine 10 is provided with a throttle sensor 96 for sensing a current throttle position $\theta$th of a throttle valve disposed in an intake manifold, and also with an engine-speed sensor 98 for sensing a current speed Ne of the engine 10. The throttle sensor 96 produces a THROTTLE signal $S\theta$ indicative of the current throttle position $\theta$th, and the engine-speed sensor 98 produces an ENGINE SPEED signal SE indicative of the current engine speed Ne. These signals are also applied to the controller 94.

The controller 94 indicated above, which serves as control means for the hydraulic control system for the transmission 14, is constituted by a so-called microcomputer which includes a CPU 102 (central processing unit), a ROM 104 (read-only memory), a RAM 106 (random-access memory). The CPU 102 is adapted to process various input signals according to control programs stored in the ROM 104, while utilizing a temporary data storage function of the RAM 106. According to the processed input signals, the CPU 102 applies to the first and second pressure regulating valves 48, 58 the first and second VALVE DRIVE signals VD1 and VD2, for regulating the pressures in the first and second pressure lines 50, 52. Further, the CPU 102 feeds to the first and second solenoids 74, 76 first and second SPEED RATIO signals RA1 and RA2 for controlling the speed ratio e of the transmission 14.

Referring next to the flow chart of FIG. 2, the operation of the present hydraulic control system for the transmission 14 will be described.

Initially, the CPU 102 executes step S1, wherein the rotating speed Nin of the first shaft 16, the rotating speed Nout of the second shaft 18, the throttle position $\theta$th, and the engine speed Ne are read and stored into the RAM 106, according to the first and second ROTATION signals SR1, SR2, the THROTTLE SIGNAL $S\theta$, and the ENGINE SPEED signal SE. Then, the CPU 102 goes to step S2 in which the speed ratio e is calculated based on the stored speeds Nin and Nout, according to the following equation (1) stored in the ROM 104:

$$e = Nout/Nin \qquad (1)$$

Figure 3:
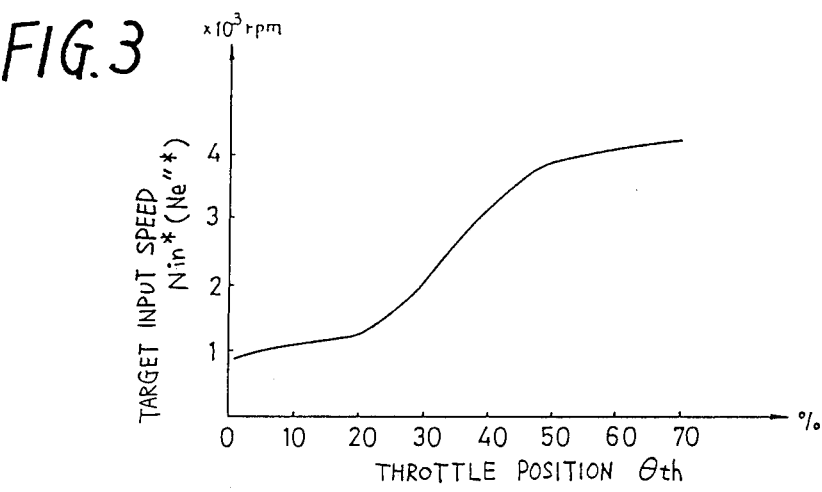
FIG. 3 is a view showing a relationship used in the operation illustrated in FIG. 2.
Figure 4:
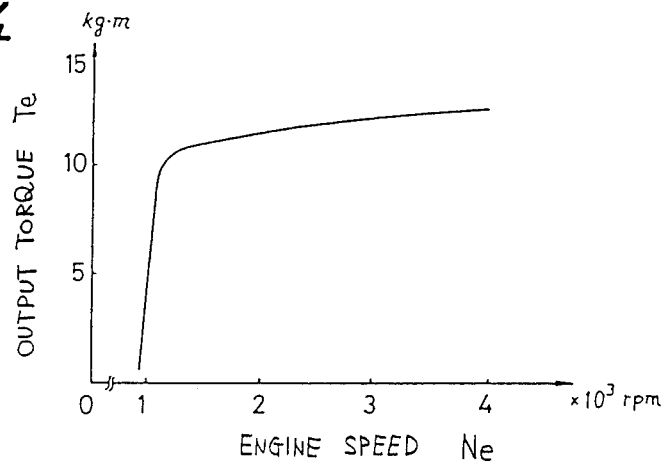
FIG. 4 is a view showing a speed-output torque curve of an engine for minimum fuel consumption.

Step S2 is followed by step S3 wherein a desired or target input speed Nin* of the first shaft 16 is determined based on the stored throttle position $\theta$th and other variables, according to a predetermined relation stored in the ROM 104. Based on the determined target input speed Nin* and the stored speed Nout, a target speed ratio e* is determined according to the above equation (1). The relation for determining the target input speed Nin* is shown in FIG. 3, by way of example only. This relation is predetermined so as to operate the engine 10 with a minimum fuel consumption, according to the torque-speed curve indicated in FIG. 4. In the following step S4, a speed-ratio control value Vo is determined according to the following equation (2) stored in the ROM 104:

$$Vo = k (e^* - e)/e \qquad (2)$$

where,
k: control constant

In step S14 which will be described, if the determined speed-ratio control value Vo is positive, the CPU 102 produces the second SPEED-RATIO signal RA2 so that the valve spool 68 is moved in the left direction, to increase the rotating speed Nout of the second shaft 18. If the determined value Vo is negative, the CPU 102 produces in step S14 the first SPEED-RATIO signal RA1 so that the valve spool 68 is moved in the right direction, to increase the rotating speed Nin of the first shaft 16. The speed-ratio control value Vo is proportional to the magnitude of the SPEED-RATIO signal RA1 or RA2, and therefore to the amount of movement of the valve spool 68. As is apparent from the equation (2), therefore, the speed-ratio control value Vo is determined so that the actual speed ratio e coincides with the determined target speed ratio e*.

Figure 5:
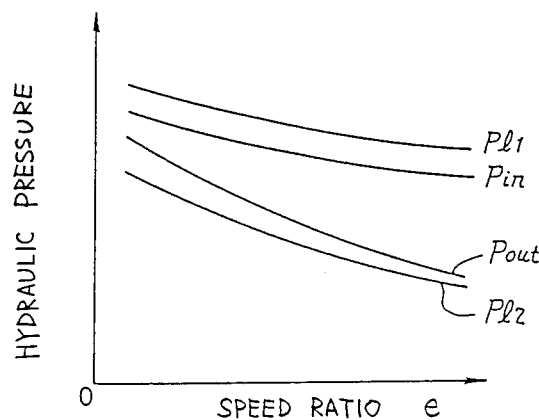
FIGS. 5 and 6 are views representing changes in hydraulic pressures in the hydraulic control system, in relation to the speed ratio of the continuously variable transmission, FIG. 5 showing the changes while the engine is operating in a positive-torque state, and FIG. 6 showing the changes while the engine is operating in an engine-brake state.
Figure 6:
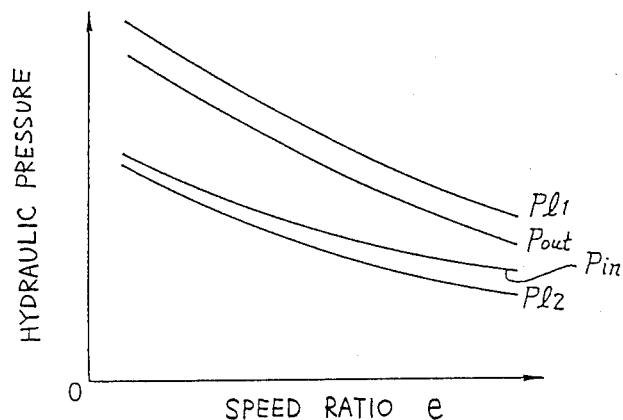

In step S5, an actual output torque Te of the engine 10 is determined based on the throttle position $\theta$th and the engine speed Ne, according to a well known relationship stored in the ROM 104. In the next step S6, the CPU 102 checks to see if the output torque Te of the engine 10 is positive or not, namely, to see if the engine 10 is placed in a positive-torque condition providing a positive torque, or in an engine-brake condition providing a braking effect to the vehicle. This judgment is necessary because the pressure changing characteristics of the hydraulic cylinders 26, 28 in relation to the speed ratio e differ depending upon the direction of power transmission, that is, depending upon whether the engine 10 is in the positive-torque condition or the engine-brake condition. Described more specifically, FIGS. 5 and 6 show changes in pressures Pin and Pout in the first and second cylinders 26, 28, in relation to the speed ratio e of the transmission 14, when the engine 10 is placed in the positive-torque and engine-brake conditions, respectively. As indicated in these figures, the magnitudes of the pressures Pin and Pout are reversed when the engine 10 is switched from the positive-torque condition to the engine-brake condition, or vice versa. Namely, the pressure in one of the cylinders 26, 28 which is provided on the drive shaft (16 in the positive-torque condition, or 18 in the engine-brake condition), is higher than the pressure in the other cylinder provided on the driven shaft. Although this phenomenon should be discussed in terms of the magnitudes of the thrust forces produced by the first and second cylinders 26, 28, the phenomenon has been discussed in terms of the pressures of the fluid in the two cylinders 26, 28, since the two cylinders have the same pressure-receiving areas.

If the checking in step S6 reveals that the output torque Te is positive, step S6 is followed by step S7 in which a second line-pressure control value V2 is determined so as to obtain a pressure (target pressure) Pout' of the second cylinder 28 necessary to establish a required minimum tension of the transmission belt 24.

Described more specifically, an optimum thrust Wout' (calculated value) of the second cylinder 28 is first obtained based on the actual output torque Te of the engine 10 and the actual speed ratio e of the transmission 14, according to the following equation (3) stored in the ROM 104. Further, the pressure Pout' (calculated value) is obtained based on the determined thrust Wout' and pressure-receiving area Aout of the second cylinder 28, and on the rotating speed Nout of the second shaft 28, according to the following equation (4) stored in the ROM 104. Then, a pressure compensation value $\Delta P2$ is calculated based on the actual speed ratio e, the target speed ratio e*, and the actual engine output torque Te, according to the following equation (5) stored in the ROM 104. Subsequently, the second line pressure Pl2 is calculated based on the pressure Pout' and the pressure compensation value $\Delta P2$ according to the following equation (6), and the second line-pressure control value V2 is determined so as to obtain the calculated second line pressure Pl2, according to the following equation (b 7).

$$Wout' = f(Te, e) \quad (3)$$

$$Pout' = \frac{Wout'}{Aout} - C2\, Nout^2 \quad (4)$$

$$\Delta P2 = f(e, e^*, Te) \quad (5)$$

$$Pl2 = Pout' - \Delta P2 \quad (6)$$

$$V2 = f(Pl2) \quad (7)$$

The equation (3) is predetermined so as to establish the required minimum tension of the transmission belt 24, i.e., a required minimum force acting on the belt 24. The thrust Wout' is increased in proportion to a quotient of the output torque Te divided by the speed ratio e, i.e., Te/e. The second term of the equation (4) is a centrifugal pressure which increases with the speed Nout, and which is subtracted from the first term of the equation to correct the pressure Pout'. A value C2 in the second term is a centrigual-force compensating constant which is predetermined by the specifications of the second cylinder 28, and the specific gravity of the working fluid used.

Figure 7:
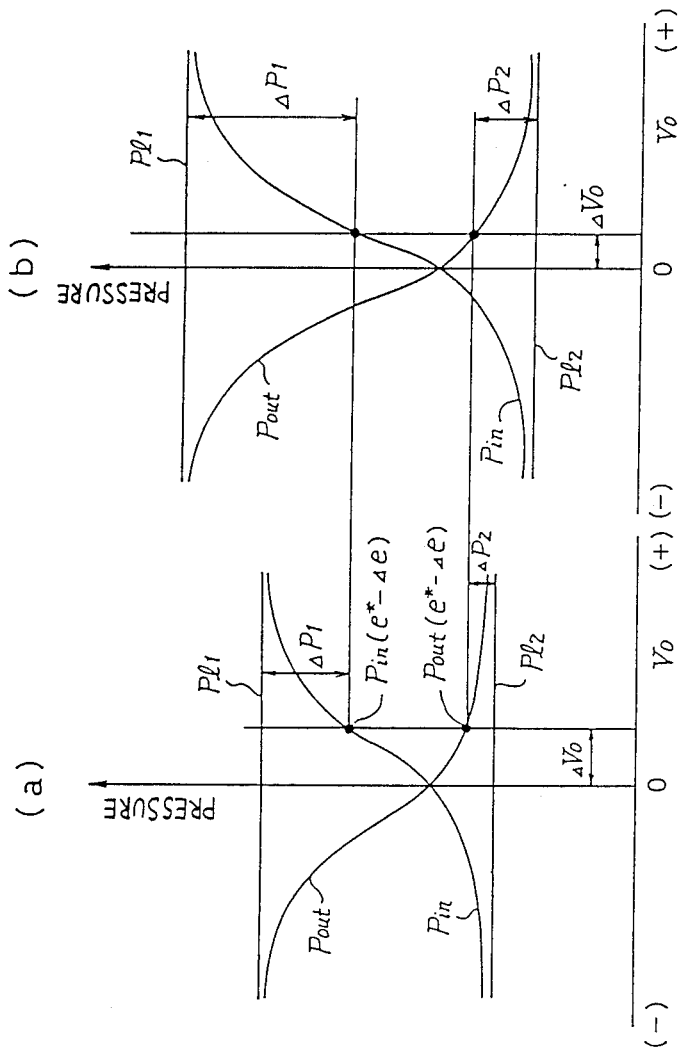
FIGS. 7(a) and 7(b) are views showing output characteristics of a shift-control valve used in the hydraulic control system of FIG. 1, FIG. 7(a) showing the characteristics while a difference between first and second lines pressures is comparatively small, while FIG. 7(b) showing the characteristics while the difference is relatively large.

The equation (5) is predetermined so as to calculate the compensation value $\Delta P2$. More specifically, FIGS. 7(a) and 7(b) show changes in the pressures Pin and Pout in the first and second cylinders 26, 28, in relation to the speed-ratio control value Vo (which corresponds to the position of the spool 68 of the shift-control valve 44), at different levels of the first and second line pressures Pl1, Pl2. Suppose the thrusts of the two cylinders 26, 28 are in equilibrium at the speed-ratio control value of $\Delta$Vo, the pressure Pout in the second cylinder 28 is higher by an amount of $\Delta P2$ than the second line pressure Pl2. Therefore, the second line pressure Pl2 to be controlled is obtained by subtracting the pressure compensation value $\Delta P2$ obtained from the equation (5), from the pressure Pout' obtained from the equation (4). This compensation value $\Delta P2$ is determined by the pressure changing characteristics of the shift-control valve 44, the speed-ratio control value Vo, and a difference between the first and second line pressures (Pl1-Pl2). Since the speed-ratio control value Vo is determined based on a difference (e* −e), and the pressure difference (Pl1-Pl2) is determined based on the actual output torque Te and the actual speed ratio e, the compensation value $\Delta P2$ is determined as a function of the actual speed ratio e, target speed ratio e* and actual output torque Te. Thus, the equation (5) is predetermined as indicated. If the pressure changing characteristics of the shift-control valve 44 is such that the pressure compensation value $\Delta P2$ is relatively small over the entire range of operation, a predetermined constant value may be used as the compensation value $\Delta P2$.

The equation (7) is provided in the form of a stored data map predetermined so as to determine the second line-pressure control value V2 for obtaining the calculated second line pressure P l 2, taking the operating characteristics of the second pressure regulating valve 58 into consideration.

In the next step S8, the first line-pressure control value V1 is determined so as to obtain the pressure Pin' (target pressure) of the first cylinder 26 necessary to provide a required minimum thrust for establishing the target speed ratio e*. Described more specifically, a thrust ratio $\gamma+$ of the two cylinders 26, 28 (Wout of the cylinder 28/Win of the cylinder 26) in the positive-torque condition of the engine 10 is first calculated based on the target speed ratio e* and the actual output torque Te of the engine 10, according to the following equation (8). Then, a thrust Win' of the first cylinder 26 is obtained based on the calculated thrust ratio $\gamma+$ and the calculated thrust Wout' of the second cylinder 28, according to the following equation (9). Further, a pressure Pin' (calculated value) is obtained based on the calculated thrust Win' and the pressure-receiving area Ain of the first cylinder 26, and the rotating speed Nin of the first shaft 16, according to the following equation (10). Then, the first line pressure Pl1 is calculated based on the calculated pressure Pin' and pressure compensation value $\Delta P1$, according to the following equation (b 11), and the first line-pressure control value V1 is determined based on the calculated first line pressure Pl1, according to the following equation (12).

$$\gamma+ = f(e^*, Te) \quad (8)$$

$$Win' = \frac{Wout'}{\gamma+} \quad (9)$$

$$Pin' = \frac{Win'}{Ain} - Cl \cdot Nin^2 \quad (10)$$

$$Pl1 = Pin' + \Delta P1 \quad (11)$$

$$V1 = f(Pl1) \quad (12)$$

The equation (8) is a relationship predetermined so as to obtain the required thrust ratio $\gamma+$ of the two cylinders 26, 28 in relation to the target speed ratio e* and actual output torque Te, in order to control the first line pressure for providing an optimum shifting response of the transmission 14 over the entire range of operation. The second term of the equation (10) is a centrifugal pressure which increases with the speed Nin, which is subtracted from the first term of the equation. A value Cl is a constant determined by the specifications of the first cylinder 26 and the specific gravity of the working fluid. The equation (b 11) is provided to determine the first line pressure Pl1 by adding the pressure compensation value $\Delta P1$ to the pressure Pin' calculated from the equation (10). This compensation value $\Delta P1$ is determined so as to provide an optimum compromise between a power loss of the hydraulic system and a control error $\Delta e$ (corresponding to $\Delta Vo$) of the speed ratio e, which power loss and the error are incompatible with each other. Described in greater detail, FIG. 7(a) shows a case where the compensation value $\Delta P1$ is relatively small, while FIG. 7(b) shows a case where the compensation value $\Delta P1$ is relatively large. In the case of FIG. 7(a), the control error $\Delta e$ is comparatively large. In the case of FIG. 7(b), the control error $\Delta e$ is comparatively small, since the pressures Pin and Pout in the first and second cylinders 26, 28 are rapidly or suddenly changed. However, as the compensation value $\Delta P1$ is increased, the power loss of the hydraulic system is increased since the first line pressure Pl1 is increasingly likely to be raised to an unnecessarily high level for some operating conditions of the transmission 14.

The equation (12) is provided in the form of a stored data map predetermined to determine the first line-pressure control value V1, for obtaining the calculated first line pressure Pl1, taking the operating characteristics of the first pressure regulating valve 48 into consideration.

If the checking in step S6 reveals that the determined output torque Te of the engine 10 is equal to zero or negative, that is, the engine 10 is in the engine-brake condition, with power being transmitted from the vehicle wheels to the engine, step S6 is followed by steps S9 and S10 similar to steps S7 and S8. In these steps S9 and S10, the second and first line-pressure control values V2 and V1 are determined based on the pressures Pin' and Pout' required for the first and second cylinders 26, 28, respectively. More specifically, step S9 is executed to: determine the optimum thrust Win' of the first cylinder 26 based on the determined torque Te and speed ratio e, according to the following equation (13); calculate the pressure Pin' to be applied to the first cylinder 26, according to the following equation (14); obtain the pressure compensation value ΔP2 according to the previously indicated equation (5); calculate the second line pressure Pl2 based on the calculated Pin' and compensation value ΔP2, according to the following equation (15); and determine the second line-pressure control value V2. The next step S10 is executed to: calculate a thrust ratio γ- of the two cylinders 26, 28 based on the target speed ratio e* and output torque Te, according to the following equation (16); obtain the thrust Wout' of the second cylinder 28 based on the calculated thrust ratio and thrust Win' of the first cylinder 26, according to the following equation (17); calculate the pressure Pout' in the second cylinder 28 according to the following equation (18); determine the first line pressure Pl1 based on the calculated pressure Pout' and compensation value ΔP1, according to the following equation (19); and determine the first line-pressure control value V1 for obtaining the determined first line pressure Pl1, according to the following equation (20).

$$Win' = f(Te, e) \quad (13)$$

$$Pin' = \frac{Win'}{Ain} - C1 \cdot Nin^2 \quad (14)$$

$$Pl2 = Pin' - \Delta P2 \quad (15)$$

$$\gamma- = f(e^*, Te) \quad (16)$$

$$Wout' = \gamma- \cdot Win' \quad (17)$$

$$Pout' = \frac{Wout'}{Aout} - C2 \cdot Nout^2 \quad (18)$$

$$Pl1 = Pout' + \Delta P1 \quad (19)$$

$$V1 = f(Pl1) \quad (20)$$

After steps S9 and S10 have been executed as described above to determine the second and first line-pressure control values V2 and V1, the next step S11 is executed to check if an error Δe of the actual speed ratio e with respect to the target speed ratio eq is positive or not. If the error Δe is positive, step S11 is followed by step S12 wherein the first and second line-pressure control values V1 and V2 are corrected according to the following equations (21) and (22), respectively. If the error Δe is equal to zero or negative, step S11 is followed by step S13 in which the first and second line-pressure control values V1 and V2 are corrected according to the following equations (23) and (24), respectively.

$$V1 = V1 + k1 (e^* - e)/e \quad (21)$$

$$V2 = V2 - k2 (e^* - e)/e \quad (22)$$

$$V1 = V1 + k3 (e - e^*)/e \quad (23)$$

$$V2 = V2 - k4 (e - e^*)/e \quad (24)$$

where, k1, k2, k3, k4: constants

As is apparent from the above equations, step S12 and S13 are executed to determine the control values V1 and V2 so that the rate of change in the speed ratio e of the transmission 14 is increased by increasing the difference between the first and second line pressures Pl1 and Pl2, as the absolute value of the error Δe increases. In the positive-torque condition, for example, the first line pressure Pl1 is higher by the compensation value ΔP1 than the pressure Pin in the first cylinder 26 (Pin in the cylinder 26 being higher than Pout in the cylinder 28, while the engine 10 is in the positive-torque condition). It is noted that the first line pressure cannot be raised so high, from the standpoint of reducing the power loss of the hydraulic system, and therefore the speed ratio e cannot be changed at a sufficiently high rate. According to the present invention, however, the difference between the first and second line pressures Pl1 and Pl2 is increased with the absolute value of tee error Δe. Namely, while the difference between the actual speed ratio e and the target speed ratio e* is relatively large, the difference between the first and second line pressures Pl1 and Pl2 is made relatively large, so that the actual speed ratio e can be changed at an accordingly high rate, i.e., the transmission 14 can be shifted with an improved response.

Figure 8:
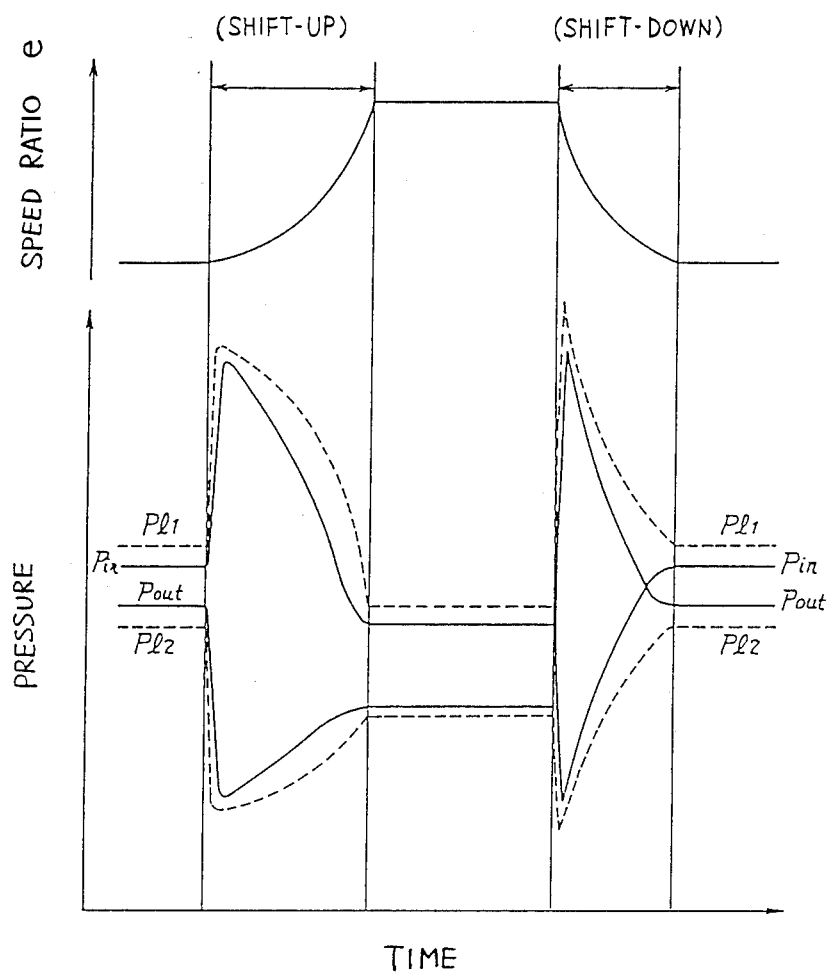
FIG. 8 is a view illustrating changes in various pressures in the system while the transmission is operating to increase and decrease its speed ratio.

The constants k1, k2, k3 and k4 used in the equations (21), (22), (23) and (24) affect the shifting response of the transmission 14. In this embodiment, k1 is smaller than k3, while k2 is smaller than k4, since a fast shift-down and a slow shift-up of the transmission 14 generally gives the vehicle driver a better drive feel. FIG. 8 shows changes in the first and second line pressures Pl1 and Pl2 and the pressures Pin and Pout in the first and second cylinders 26, 28 according to the above equations (21), (22), (23) and (24), as the speed ratio is changed while the transmission 14 (engine 10) is operating in the positive-torque condition (with Pin higher than Pout). As is apparent from the figure, when the transmission 14 is shifted up (with an increasing speed ratio e) by a leftward movement (in FIG. 1) of the valve spool 68 of the shift-control valve 44, the pressure Pin in the first cylinder 26 is raised while at the same time the pressure Pout in the second cylinder 28 is lowered. On the other hand, when the transmission 14 is shifted down (with a decreasing speed ratio e), the pressure Pin in the first cylinder 26 is lowered while at the same time the pressure Pout in the second cylinder 28 is raised. Thus, there is developed a considerably large difference in the thrust force between the two cylinders 26, 28, which difference is sufficient to provide a fast response of the cylinders for relatively rapidly changing the speed ratio e of the transmission 14. FIG. 8 indicates that an amount of decrease in the second line pressure Pl2 is smaller than an amount of increase in the first line pressure Pl1. This is because the above-indicated equations are so determined that a decrease in the thrust force of the cylinder from which the fluid is discharged is smaller by a suitable amount than an increase in the thrust force of the cylinder to which the fluid is supplied, in order to avoid a slip of the transmission belt 24. According to this arrangement, a sufficient tension is given to the belt 24 by the movable rotor of the pulley which is activated by the cylinder whose effective diameter is decreased, i.e., by the cylinder from which the fluid is discharged, whereby the belt 24 is protected from slipping on the pulleys.

In step S14, which is the last step of the series of steps of a control cycle, the signals RA1, RA2, VD1, VD2 are produced according to the speed-ratio control value Vo and the first and second line-pressure control values V1 and V2 which have been determined in the previous steps. As a result, the speed ratio e, and the first and second line pressures Pl1 and Pl2 are controlled, as indicated in FIGS. 5, 6, 7(a), 7(b) and 8.

As described above, the present hydraulic control system are adapted to control the first and second line pressures Pl1 and Pl2, by means of the first and second pressure regulating valves 48, 58, respectively. Therefore, the flow rate of the fluid to be fed into one of the two cylinders 26, 28, and the flow rate of the fluid to be discharged from the other cylinder, can be determined by a difference between the first and second line pressures Pl1 and Pl2. In other words, the rate at which the continuously variable transmission 14 is shifted up and down is not affected by the current speed ratio e and the transmission torque (output torque Te), but is solely determined by the line pressure difference between Pl1 and Pl2. Hence, the transmission 14 controlled by the instant hydraulic control system can be shifted at a relatively high speed, i.e., provides a fast response to the required change in the speed ratio.

Further, the first line pressure Pl1 is controlled by controlling the first pressure regulating vale 48 in relation to the output torque Te of the engine 10, and the actual speed ratio e, so as to minimize the power loss of the hydraulic system, but so that the transmission 14 can be shifted at a sufficiently high rate. Furthermore, the second line pressure Pl2 is controlled by controlling the second pressure regulating valve 58 in relation to the speed raio e and transmission torque, so as to minimize the power loss, but to permit the transmission 14 to operate without a slip of the belt 24. Thus, the instant hydraulic control system is advantageously adapted for considerable reduction in the power loss of the vehicle engine due to unnecessarily high hydraulic pressures used for the transmission 14.

In the present embodiment, the first and second pressure regulating valves 48, 58 are connected in series, so that the pressure of the fluid from the first pressure regulating valve 48 is regulated by the second pressure regulating valve 58. This arrangement reduces an amount of the fluid necessary to establish the second line pressure by the second pressure regulating valve 58, thereby reducing a required delivery of the oil pump 42 and consequently providing a further decrease of the power loss of the hydraulic system.

Other embodiments of the present invention will be described. The same reference numerals as used in the preceding embodiment will be used in these other embodiments to identify the functionally corresponding elements, and no redundant description of these elements will be provided.

Figure 9:
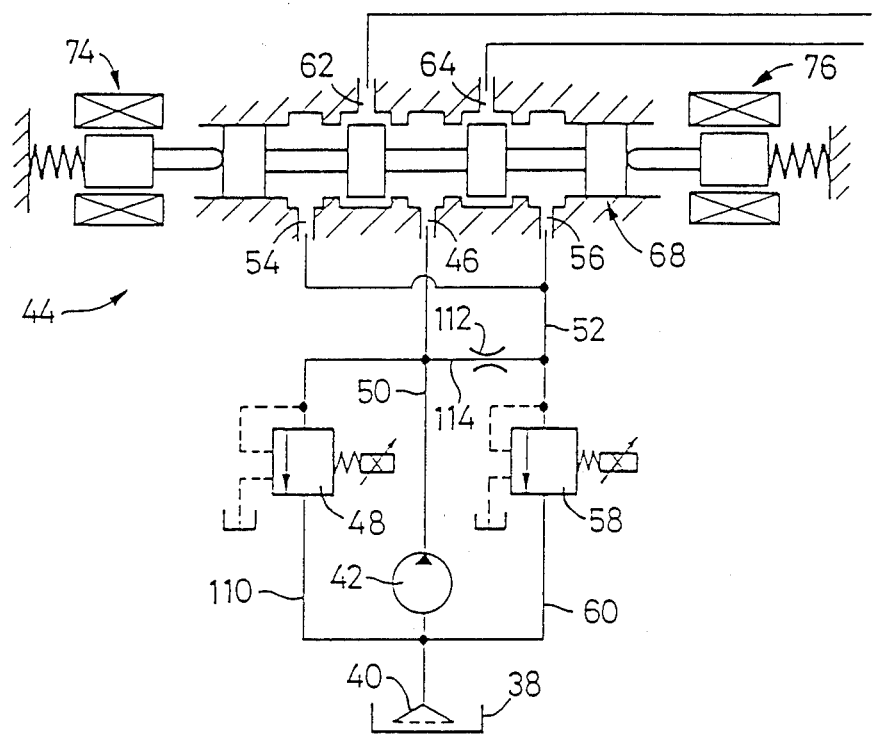
FIGS. 9 and 10 are schematic fragmentary views illustrating other embodiments of the present invention.

There is shown in FIG. 9 a hydraulic control system for the belt-and-pulley type continuously variable transmission 14, wherein the first and second pressure regulating valves 48, 58 are disposed at different positions in the hydraulic circuit, than those used in the preceding embodiment. Described in more detail, the first pressure regulating valve 48 is disposed so that the fluid in the first pressure line 50 may be released through the valve 48 directly to the suction side of the oil pump 42 through a drain line 110. The fluid delivered from the oil pump 42 through the first pressure line 50 is also fed to the second pressure line 52 through a line 114 in which a flow restrictor 112 is provided. This line 114 provides a flow of the fluid necessary to enable the second regulating valve 58 to function for controlling the second line pressure Pl2, and to assure a difference between the first and second line pressures Pl1 and Pl2. In other words, the second pressure regulating vale 58 operates to regulate the pressure of the fluid supplied through the line 114, and the pressure of the fluid discharged through the first and second drain ports 54, 56 of the shift-control valve 44. Like the preceding embodiment, the present embodiment constructed as indicated above is adapted to regulate the first and second line pressures Pl1 and Pl2 to the required minimum levels, providing the same advantages as previously described.

Figure 10:
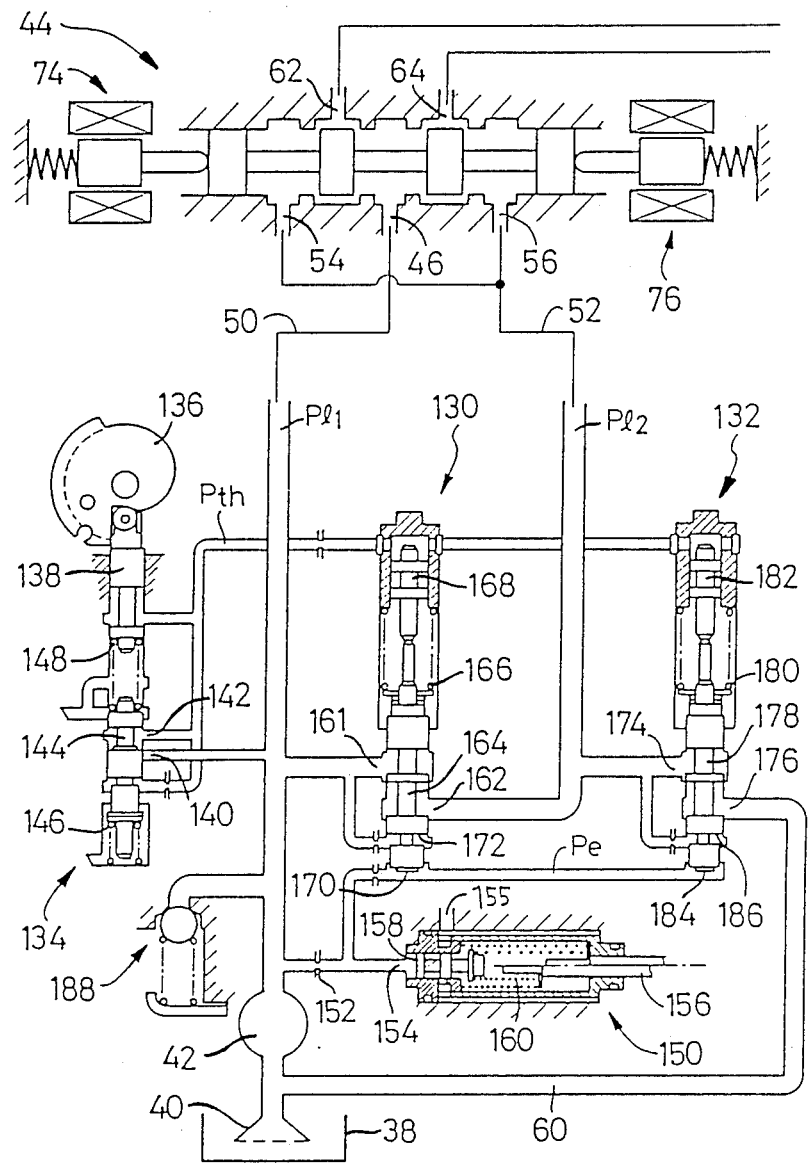

Referring next to FIG. 10, there is shown another hydraulic control system wherein hydraulically controlled first and second pressure regulating valves 130, 132 are used, in place of the pressure regulating valves 48, 58 which are solenoid-operated proportional relief valves.

Described in greater detail, the hydraulic control system includes a throttle-position sensing valve 134 for sensing the operating position of a throttle valve (not shown). This sensing valve 134 includes: a plunger 138 axially moved by a cam 136 which rotates with the throttle valve; a valve spool 144 operable to connect or disconnect an input port 140 and an output port 142; a spring 146 for biasing the spool 144 in a direction to disconnect the input and output ports 140, 142; and a spring 148 disposed between the plunger 138 and the spool 144, for biasing the spool 144 in a direction to effect communication between the input and output ports 140, 142. The biasing force of the spring 148 is varied with the throttle position of the throttle valve. In operation, the valve spool 144 is moved to a position at which the biasing force of the spring 148 in the direction to open the valve is equal to a sum of the biasing force of the spring 146 in the direction to close the valve, and a thrust force produced by a feedback pressure (Pth), which acts to close the valve. The throttle-position sensing valve 134 having the thus operated spool 144 produces from the output port 142 a throttle pressure Pth which increases with the throttle valve opening. The throttle pressure Pth is applied to the first and second pressure regulating valves 130, 132.

The hydraulic control system further includes a speed-ratio sensing valve 150 which includes: a port 154 connected to the first pressure line 50 through a flow restrictor 152; a rod 156 which is axially moved in sliding contact with the movable rotor 34 or 36 of the transmission 14; a valve spool 158 which is axially movable to change the area of communication between the port 154 and a drain port 155; a spring 160 disposed between the spool 158 and the rod 156, for biasing the spool 158 with a biasing force which varies with a change in the position of the rod 156, thereby changing the flow of the fluid from the port 154 to the drain port 155. The sensing valve 150 applies to the first and second pressure regulating valves 130, 132 a speed-ratio pressure Pe which increases with an increase in the speed ratio of the transmission 14. The upper and lower halves of the speed-ratio sensing valve 150 above and below its centerline as shown in FIG. 10, correspond to two different positions of the rod 156.

The first pressure regulating valve 130 is disposed between the first pressure line 50 and the second pressure line 52, and functions to regulate the first line pressure Pl1 by releasing a portion of the fluid from the first pressure line 50 to the second pressure line 52. The valve 130 includes: a valve spool 164 operable to control communication between an input port 161 and an output port 162, which communicate with the first and second pressure lines 50, 52, respectively; a spring 166 for biasing the spool 164 in a direction to disconnect the input and output ports 161, 162 from each other (to close the valve); and a plunger 168 which receives the previously indicated throttle pressure Pth, and transmits the received pressure Pth to the spool 164 in the direction to close the valve. The valve spool 164 has a pair of pressure-receiving surfaces 170, 172 which receive the speed-ratio pressure Pe and the first line pressure Pl1. The spool 164 is moved to a position at which a thrust force to open the valve 130 based on the speed-ratio pressure Pe and the first line pressure Pl1 acting on the pressure-receiving surfaces 170, 172 is equal to a thrust force to close the valve 130 based on the biasing force of the spring 166 and the throttle pressure Pth transmitted from the plunger 168. In this arrangement, the first line pressure PL1 is lowered with an increase in the speed-ratio pressure Pe, and is raised with an increase in the throttle pressure Pth. Thus, the first line pressure Pl1 is controlled based on a currently required output of the vehicle expressed in the form of the current position of the throttle valve, and on the actual speed ratio e of the continuously variable transmission 14, so that the first line pressure Pl1 is held at a minimum level necessary to provide a sufficient thrust force for establishing the determined target speed ratio e* of the transmission 14. The areas of the pressure-receiving surfaces 170, 172, the biasing force of the spring 166 and the pressure-receiving area of the plunger 168, are determined so as to control the first line pressure Pl1 as described above.

The second pressure regulating valve 132 is disposed between the second pressure line 52 and the drain line 60, for regulating the second line pressure Pl2 by releasing a portion of the fluid from the second pressure line 52 to the dain line 60. The second pressure regulating valve 132 includes: a valve spool 178 operable to control communication between an input port 174 and an output port 176, which communicate with the second pressure line 52 and the drain line 60, respectively; a spring 180 for biasing the spool 178 in a direction to disconnect the input and output ports 174, 176 from each other (to close the valve); and a plunger 182 which receives the throttle pressure Pth, and transmits the received pressure Pth to the spool 178 in the direction to close the valve. The valve spool 178 has a pair of pressure-receiving surfaces 184, 862 which receive the speed-ratio pressure Pe and the second line pressure Pl2. The spool 178 is moved to a position at which a thrust force to close the valve 132 based on the speed-ratio pressure Pe and the second line pressure Pl2 acting on the pressure-receiving surfaces 184, 186 is equal to a thrust force to open the valve 132 based on the biasing force of the spring 180 and the throttle pressure Pth transmitted from the plunger 182. In this arrangement, the second line pressure Pl2 is lowered with an increase in the speed-ratio pressure Pe, and is raised with an increase in the throttle pressure Pth. Thus, the second line pressure Pl2 is controlled based on the currently required output of the vehicle (current position of the throttle valve), and on the actual speed ratio e of the transmission 14, so that the second line pressure Pl2 is held at a minimum level necessary to provide a sufficient thrust for establishing a tension of the transmission belt 24 that prevents a slip of the belt on the pulleys 20, 22. The areas of the pressure-receiving surfaces 184, 186, the biasing force of the spring 180 and the pressure-receiving area of the plunger 182, are determined so as to control the second line pressure Pl2 as described above. Reference numeral 188 designates a pressure relief valve.

According to the modified embodiment as described above, the shift-control valve 44 is controlled by the controller 94, so that the actual speed ratio e coincides with the determined target speed ratio e*. Further, the first and second pressure regulating valves 130 and 132 are hydraulically controlled, so as to control the first and second line pressures Pl1 and Pl2, so that the first line pressure Pl1 permits a fast change of the actual speed ratio e to the target speed ratio e*, and the second line pressure Pl2 assures a slip-free tension of the transmission belt 24. Thus, the instant embodiment provides the same advantages as offered by the preceding embodiments.

The shift-control valve 44 may be operated by control pressures, as illustrated in FIGS. 11 through 15.

Figure 12:
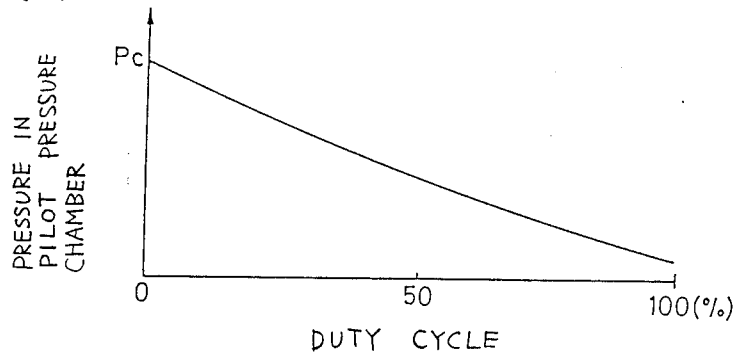
FIG. 12 is a view showing a relation between a pressure in a control pressure chamber and a duty of a solenoid valve.
Figure 11:
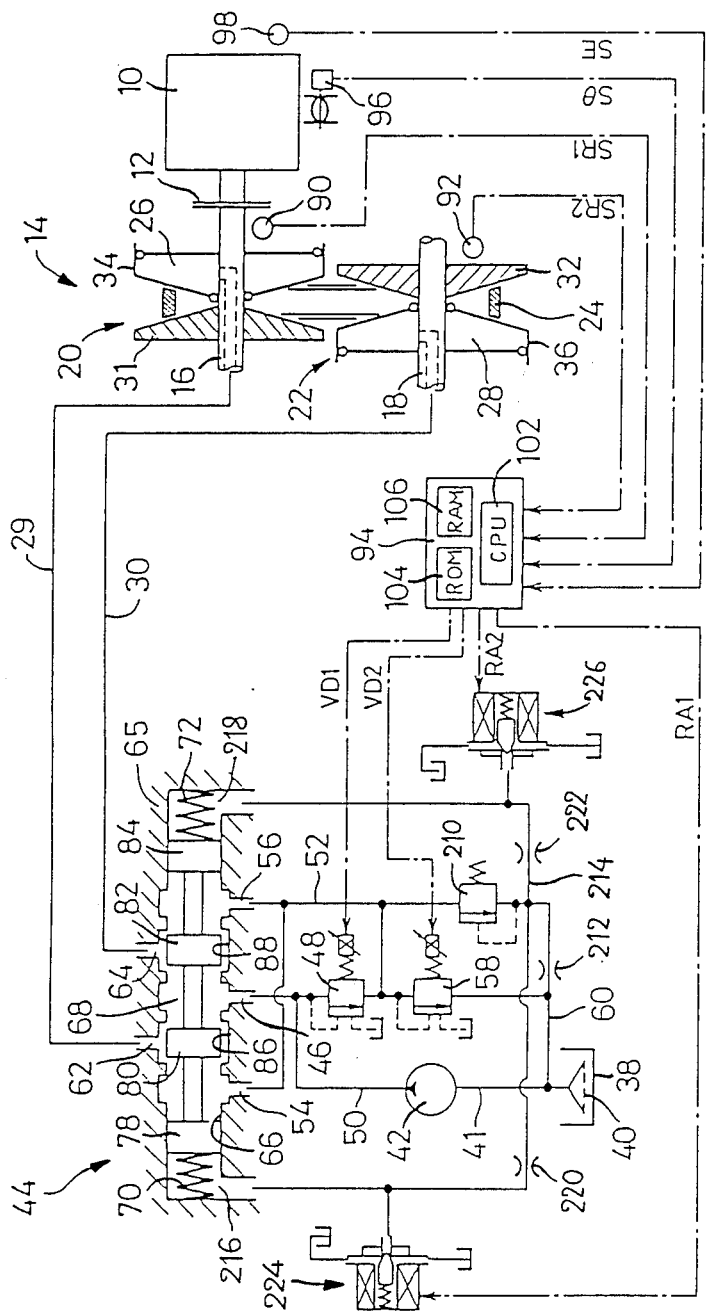
FIG. 11 is a schematic view corresponding to that of FIG. 1, showing a embodiment of the invention.

In an example of FIG. 11, a control pressure source is provided between the second pressure line 52 and the drain line 60. The control pressure source consists of a pressure reducing valve 210 serving as a third pressure regulating valve, and a flow restrictor 212 in series connection with the reducing valve 210. A pilot pressure line 214 is connected between the valve 210 and the flow restrictor 212, to apply a pilot pressure Pc to the shift-control valve 44. The pilot pressure Pc established by the pressure reducing valve 210 is lower than the second line pressure Pl2 by a suitable value. The shift-control valve 44 has a pair of pilot pressure chambers fluid-tightly formed at the opposite ends of the valve spool 68, i.e., a first and a second pilot pressure chamber 216, 218 which are connected to the pilot pressure line 214. To the pilot pressure line 214, there are connected a first and a second solenoid-operated pilot valve 224, 226, via respective flow restrictors 220, 222. Namely, the pilot valves 224, 226 are connected to the pilot pressure line 214, between the flow restrictors 220, 222 and the pilot pressure chambers 216, 218. When the first and second pilot valves 224, 226 are open, the fluid in the pilot pressure chambers 216, 218 is discharged to a drain via the line 214 and the respective valves 224, 226. When these valves 224, 26 are closed, the pilot pressure Pc is applied to the first and second pilot pressure chambers 216, 218. With the pressure Pc applied to the pilot pressure chamber 216 or 218, the valve spool 68 is moved against the biasing force of the first or second spring 70, 72. As described later, the first and second pilot valves 224, 226 are turned on and off, with their duties (%) being controlled according to speed-ratio signals RA1 and RA2, so that the pressures in the first and second pilot pressure chambers 216, 218 are varied continuously, in relation to the duty cycle or duty ratio of the valve 224, 226, as indicated in FIG. 12. Accordingly, the position of the valve spool 68 is continuously changed.

Figure 2:
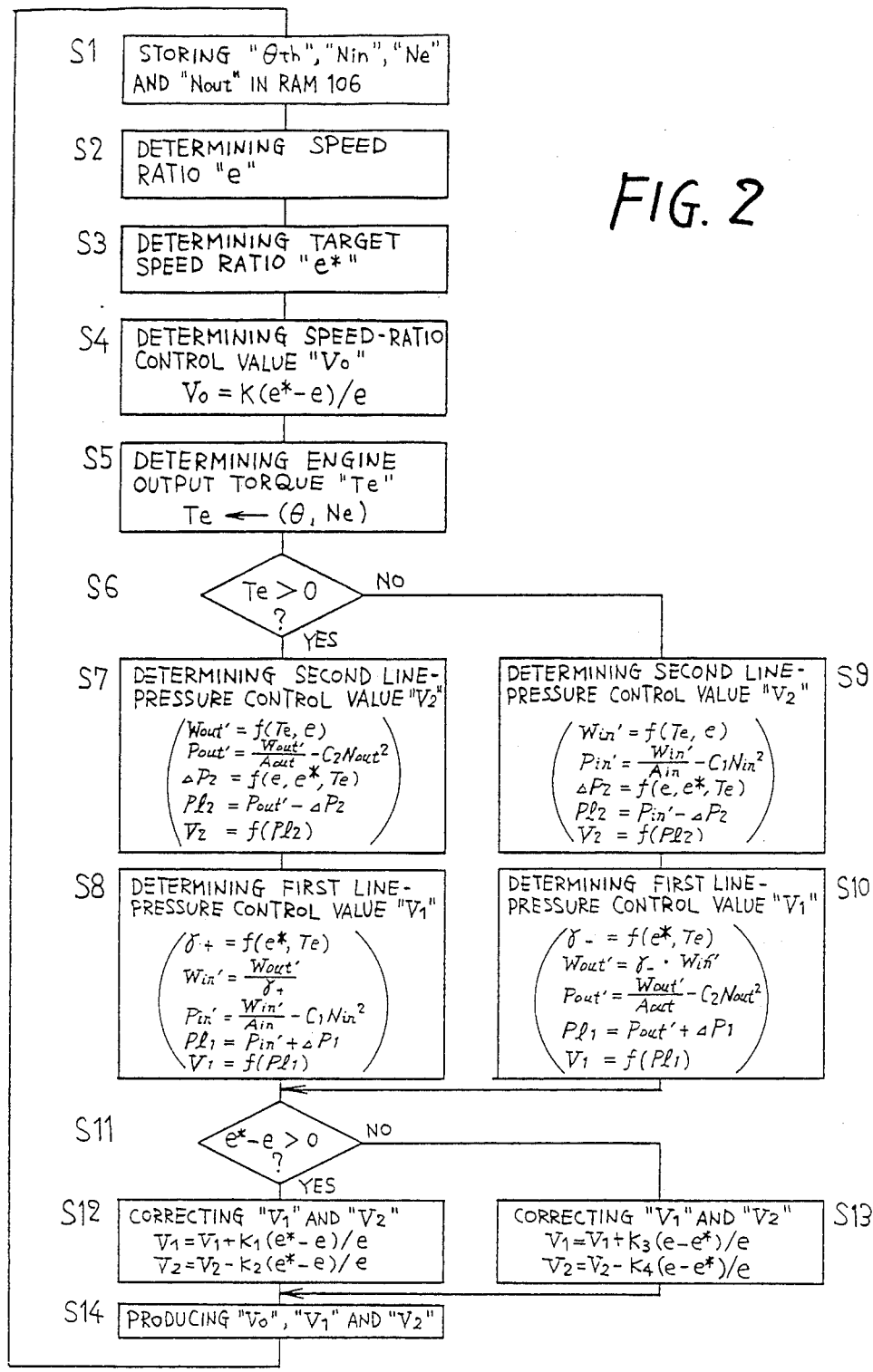
FIG. 2 is a flow chart illustrating an operation of the embodiment of FIG. 1.

The present embodiment of the hydraulic control system is operated according to the flow chart of FIG. 2, and provides the same advantages as the first embodiment of FIG. 1. The valve spool 68 of the shift-control valve 44 is activated by the pilot pressure Pc under the control of the pilot valves 224, 226, to thereby change the output pressures of the shift-control valve 44. Therefore, the operating characteristics of the shift-control valve 44 or the shifting pattern of the transmission 14 is not influenced by the specific factors of a link mechanism, which is conventionally used to operate a valve spool, being operatively connected at one end to an operating member for the valve spool, and engaging at the other end an axially movable rotor of a variable-diameter pulley. Thus, the instant shift-control valve 44 has an improved freedom from such an actuator linkage. Further, since the shift-control valve 44 is not operatively connected to the movable rotor via such a linkage, the valve 44 has an improved freedom in its location relative to the pulley, and is free from control inaccuracy due to an accumulative positional error inherent in the link mechanism. In the present arrangement, the pilot pressure Pc produced by the pilot pressure source 210, 212 and regulated by the solenoid-operated pilot valve device 224, 226 is applied to the valve spool 68, assuring a stable shifting of the transmission 14. This is contrary to an arrangement wherein a valve spool is subjected to a first or second line pressure under the control of an electromagnetic control device, which line pressure is varied in relation to the speed ratio of the transmission, and a torque transmitted by the transmission. In this latter arrangement, a variation in the first or second line pressure causes a variation in the shifting speed of the transmission. Further, the instant embodiment uses the pilot valves 224, 226 which are turned on and off with controlled duty cycles and which are simpler and smaller in size than the solenoids 74, 76 of the first embodiment which directly act on the valve spool, producing magnetic forces proportional to the amount of currents applied thereto. Moreover, the pilot valves 224, 226 must not be disposed adjacent to the shift-control valve 44. Since the valve spool 68 is moved by a pressure differential, the spool 68 may be moved with a relatively large drive force, and therefore a movement of the spool 68 is less likely to be influenced by foreign matters contained in the working fluid. Furthermore, the pilot valves 224, 226 may receive the speed ratio signals RA1 and RA2 directly from the controller 94 in the form of a computer, without using an A/D converter, and without a constant-current amplifier which would be required when linear solenoids are used, to avoid an influence of a change in the resistance of the solenoid coils with the temperature.

Figure 13:
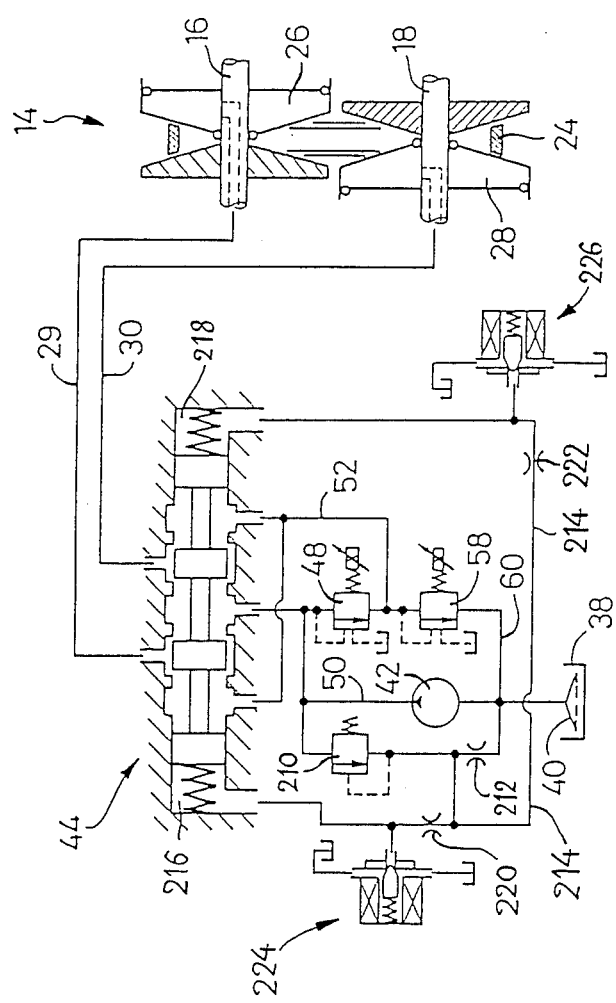
FIGS. 13 through 18 are schematic views showing other modified embodiments of the invention.

In the embodiment of FIG. 13, the pressure reducing valve 210 and the flow restrictor 212 are disposed in series between the first pressure line 50 and the drain line 60. According to this arrangement, the first line pressure Pl1 is lowered by the reducing valve 210 to a lower pilot pressure Pc, which is led to the pilot pressure chambers 216, 218 via the pilot pressure line 214.

Figure 14:
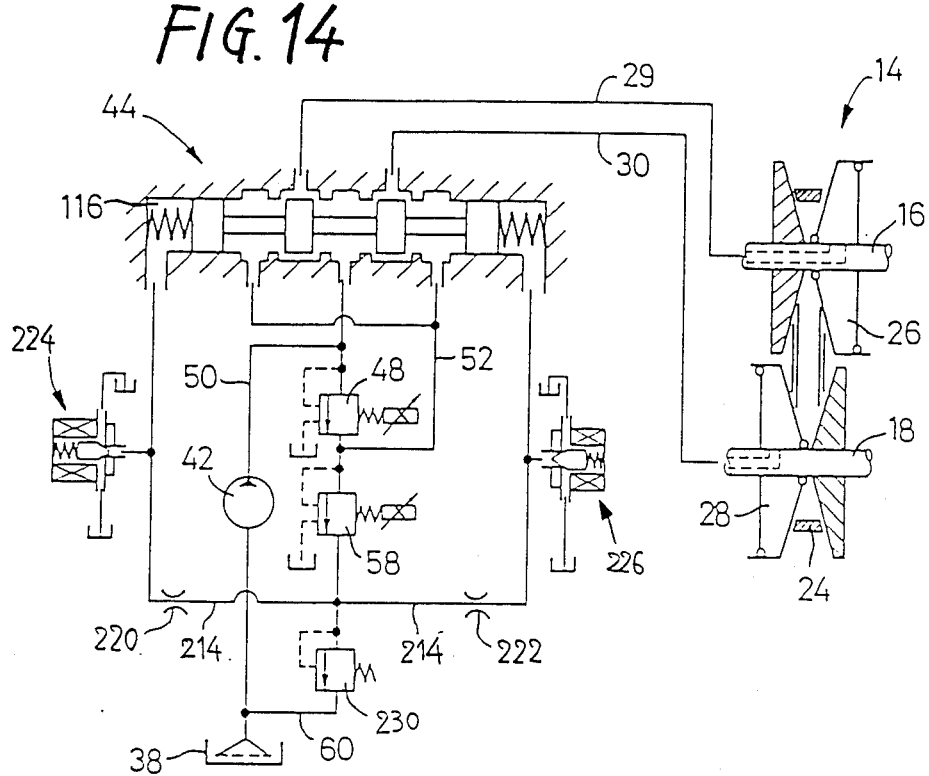

In the embodiment of FIG. 14, a third pressure regulating valve 230 is disposed in the drain line 60, to regulate the pressure of the fluid from the second pressure regulating valve 58, and thereby produce the pilot pressure Pc. According to this arrangement, the pilot pressure Pc is obtained between the second and third pressure regulating valves 58, 230, and is fed to the shift-control valve 44 via the pilot pressure line 214.

Figure 15:
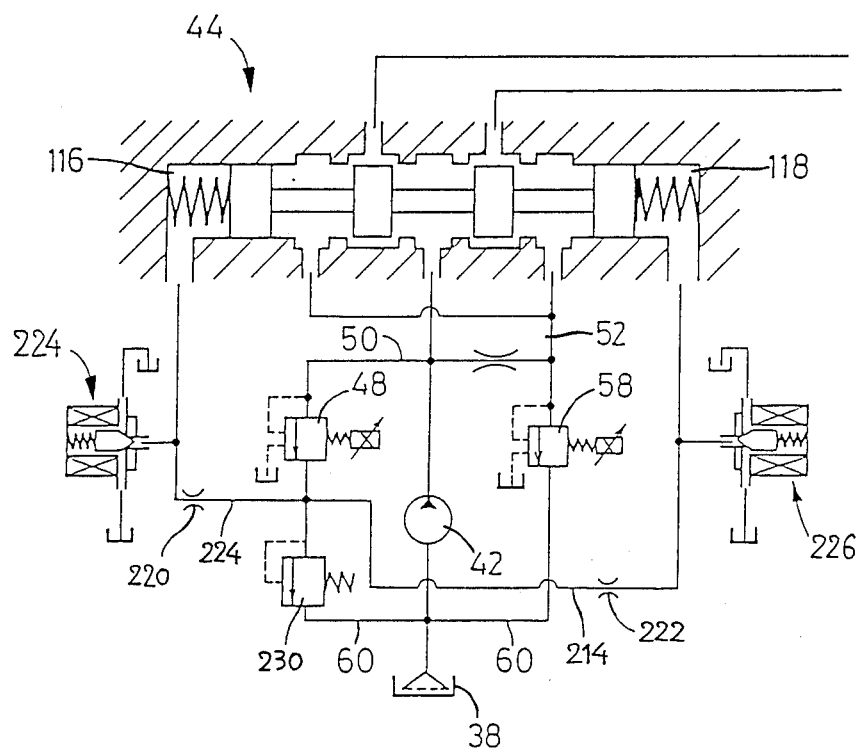

Referring to FIG. 15, the first and second pressure regulating valves 48 and 50 for establishing the first and second line pressures Pl1 and Pl2 are disposed in parallel connection with each other, and the third pressure regulating valve 230 is disposed in the drain line 60, for regulating the pressure of the fluid from the valve 48, and thereby producing the pilot pressure Pc. The pressure Pc is led to the shift-control valve 44, via the pilot pressure line 214 connected between the first and third pressure regulating valves 48, 230.

Figure 16:
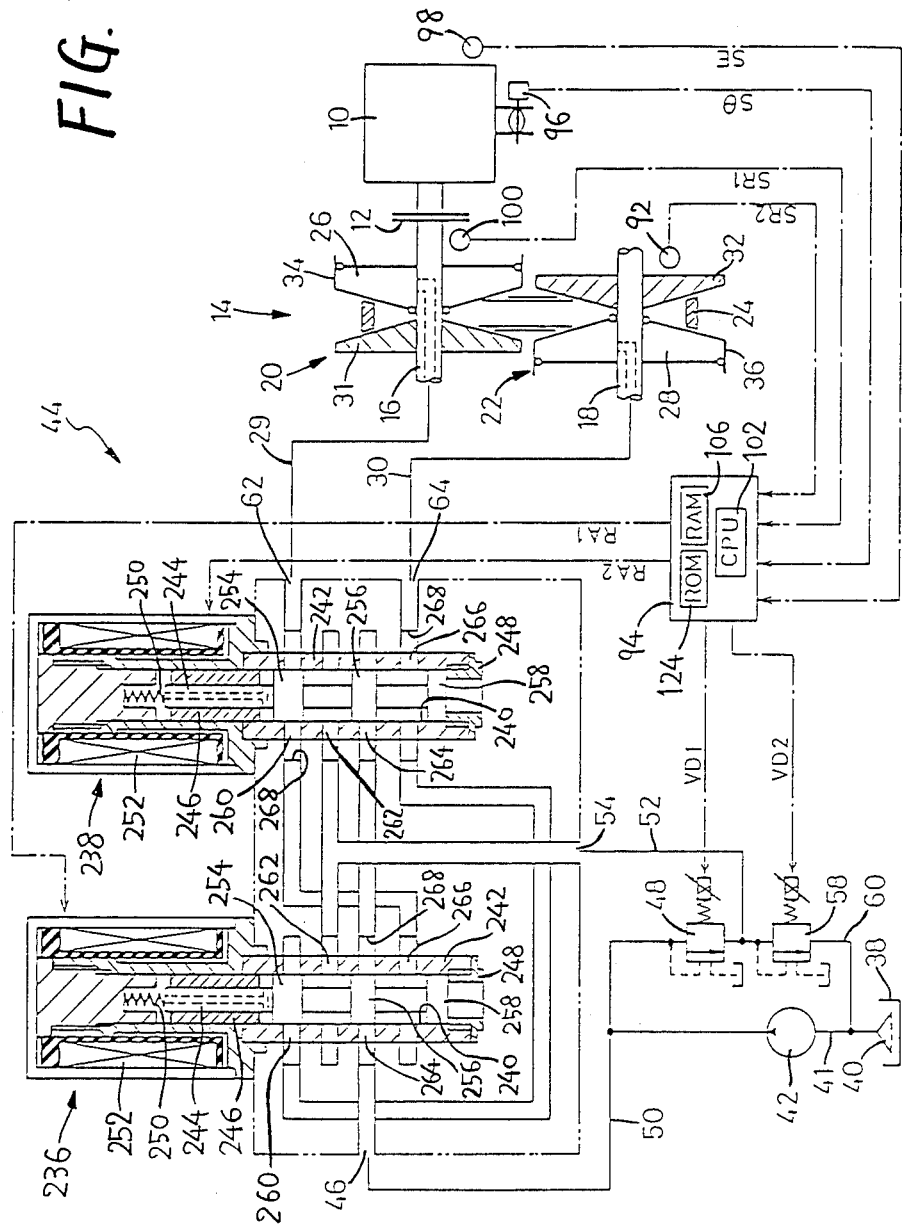

The shift-control valve 44 may be constituted by a pair of first and second directly-actuated solenoid valves 236 and 238, as shown in FIG. 16. This shift-control valve 44 has an input port 46 connected to the first pressure line 50, a drain port 54 connected to the drain line 60 via the second pressure regulating valve 58, a first output port 62 connected to the first cylinder 26 through the conduit 29, and a second output port 64 connected to the second cylinder 28 through the conduit 30. Since the first and second solenoid valves 236, 238 are identical in construction with each other, only the first valve 236 will be explained. The same reference numerals are used to identify the corresponding elements of the two valves 236, 238. The following description on the first valve 236 will apply to the second valve 238.

The first solenoid valve 236 includes: a valve body 242 having a cylinder bore 240; a valve spool 244 slidably received within the cylinder bore 240; a core 246 fitted on one end portion of the valve spool 244; a spring 250 for biasing the valve spool 244 in an axial direction from the above one end portion toward the other end portion, so as to hold the spool 244 in abutting contact with a stop member 248 fixedly disposed at one end of the cylinder bore 240 remote from the spring 250; and an electromagnetic coil 252 for producing an electromagnetic force for attracting the core 246, and thereby moving the valve spool 244 against the biasing action of the spring 250. The valve spool 244 has a first land 254, a second land 256 and a third land 258. The valve body 242 has a first and a second port 260, 262 which communicate with the cylinder bore 240. The first land 254 is formed so as to permit or inhibit fluid communication between the first and second ports 260, 262. The valve body 242 further has a third and a fourth port 264, 266 communicating with the cylinder bore 240. The second land 256 is formed so as to permit or inhibit fluid communication between the third and fourth ports 264, 266. In the present embodiment, the coil 252 and the core 246 constitute an electromagnet, and this electromagnet and the spring 250 constitute drive means for positioning the valve spool 244. The input port 46 is connected to the third ports 264 of the first and second solenoid valves 236, 238. The drain port 54 is connected to the second ports 262 of the valves 236, 238. The first output port 62 is connected to the fourth port 66 of the first solenoid valve 236 and to the first port 60 of the second solenoid valve 238. The second output port 64 is connected to the first port 260 of the first solenoid valve 236 and to the fourth port 266 of the second solenoid valve 238.

While the shift-control valve 44 is placed in its neutral position, that is, while the valve spools 244 of the first and second solenoid valves 236, 238 are held in abutment on the stop members 248 under the biasing action of the springs 246, the first and second cylinders 26, 28 are disconnected from the first and second pressure lines 50, 52, respectively. For improved output characteristics of the shift-control valve 44 in its neutral position, suitable leak lines permitting restricted leak flows of the fluid may be provided between the first and second cylinders 26, 28, and the first and second pressure lines 50, 52.

When a first speed ratio signal RA1 is applied to the coil 252 of the first solenoid valve 236, the first pressure line 50 is connected to the first cylinder 26, while the second pressure line 52 is connected to the second cylinder 28. Consequently, the fluid flows into the first cylinder 26, while the fluid flows out of the second cylinder 28, whereby the speed ratio of the transmission 14 is increased. When a second speed ratio signal RA2 is applied to the coil 252 of the second solenoid valve 238, the first pressure line 50 is connected to the second cylinder 28, while the second pressure line 52 is connected to the first cylinder 26. As a result, the fluid flows into the second cylinder 28 while the fluid flows out of the first cylinder 26, whereby the speed ratio of the transmission 14 is decreased. Thus, the first and second solenoid valves 236, 238 are provided primarily for increasing and decreasing the speed ratio of the transmission 14. In the figure, reference numeral 268 designates annular grooves which are formed in communication with the ports 260, 262, 264, 266, and which are positioned outwardly of these ports in the radial direction of the bore 240.

In the present embodiment, the neutral position of the shift-control valve 44 is established when the two valve spools 244 of the first and second solenoid valves 236, 238 are located at a predetermined position, that is, when the spools 244 are held in abutting contact with the respective stop members 248 under the biasing actions of the springs 250, with the stop members 248 inhibiting axial movements of the spools 244. This arrangement is less likely to suffer from a fluctuation in the neutral position of the shift-control valve due to an accumulative error of the component parts, as compared with a conventional shift-control valve wherein the direction of flow of the fluid is controlled by movements of a single spool which is actuated by a link mechanism. The shift-control valve 44 of the present embodiment does not require a procedure to adjust the neutral position during assembling of the hydraulic system. The instant shift-control valve 44 is also substantially free of a fluctuation in its neutral position due to contamination of the working fluid with foreign matters or due to a variation in the sliding resistance of the spools, as compared with a conventional shift-control valve wherein two springs are used to bias a valve spool in opposite directions, and the neutral position of the spool is placed at a point of equilibrium of the biasing forces of the two springs. Further, since the two spools 244 are used for the shift-control valve 44, the length of each spool 244 and the length of the corresponding core 240 may be reduced, as compared with those of a shift-control valve using a single spool. Consequently, the machining of the spools 244 and bores 240 may be made simple. Further, the spools 244 which are directly actuated by electromagnetic forces, are less likely to be influenced by contamination of the fluid or a variation in the sliding resistance of the spools.

Figure 17:
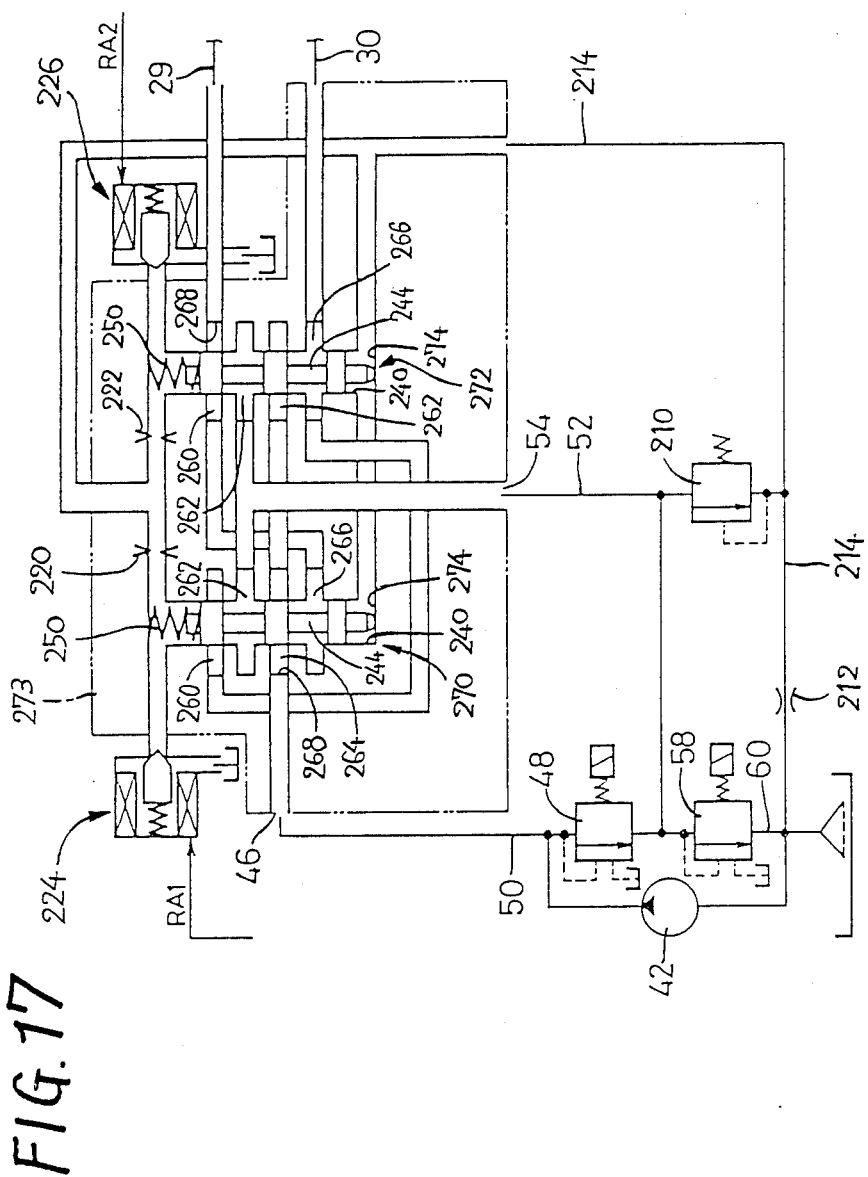

Another modification of the shift-control valve 44 is depicted in FIG. 17, wherein each valve spool 244 is operated by a pilot pressure. More specifically, the shift-control valve 44 consists of a first and a second spool valve 270, 272 of the same construction which are functionally equivalent to the first and second solenoid valves 236, 238 of the preceding embodiment of FIG. 16. These first and second spool valves 270, 272 are disposed in the cylinder bores 240 which are parts of the fluid passages formed in a cylinder body 273, as in the preceding embodiment. The speed ratio of the transmission 14 is increased when the valve spool 244 of the first spool valve 270 is moved within the bore 240 in an axial direction against the biasing action of the spring 250. On the other hand, the speed ratio is decreased when the spool 244 of the second spool valve 272 is moved within the bore 240 in an axial direction against the biasing action of the corresponding spring 250. Each spool 244 is normally held in abutting contact with an inner surface 274 which defines one end of the cylinder bore 240 remote from the spring 250. Thus, this inner surface 274 functions as a stop for determining the neutral position of the spool 244. Between the second pressure line 52 and the drain line 60, there are disposed a pressure reducing valve 210 and a flow restrictor 212 in series connection with each other. The pilot pressure to be applied to the valve spool 244 is obtained between the reducing valve 210 and the flow restrictor 212. Described in more detail, a pilot pressure line 214 is connected to a line between the reducing valve 210 and the restrictor 212, so that the pilot pressure established by the reducing valve 210 is applied to the end face of each valve spool 244 of the first and second spool valves 270, 272, which faces the inner surface 274. The pilot pressure is applied through flow restrictors 220, 222, also to the other end face of each valve spool 244 on the side of the spring 250. The above other end face of the valve spool 244 of the first valve 270, which is exposed to the pilot pressure through the restrictor 220, is connected to a drain or exposed to the atmosphere, through a first solenoid-operated pilot valve 224. The corresponding end face of the spool 244 of the second valve 270 exposed to the pilot pressure through the restrictor 222 is connected to a drain through a second solenoid-operated pilot valve 226. While the first and second pilot valves 224, 226 are placed in their closed position, the shift-control valve 44 is placed in its neutral position. When the first pilot valve 224 is opened, the shift-control valve 44 is operated so as to increase the speed ratio of the transmission 14. When the second pilot valve 226 is opened, the valve 44 is operated so as to decrease the speed ratio. In the present embodiment, the first and second pilot valves 224, 226 are controlled by the speed ratio signals RA1 and RA2, which energize and deenergize the corresponding solenoid coils so as to control the duty cycles of the valves.

Figure 18:
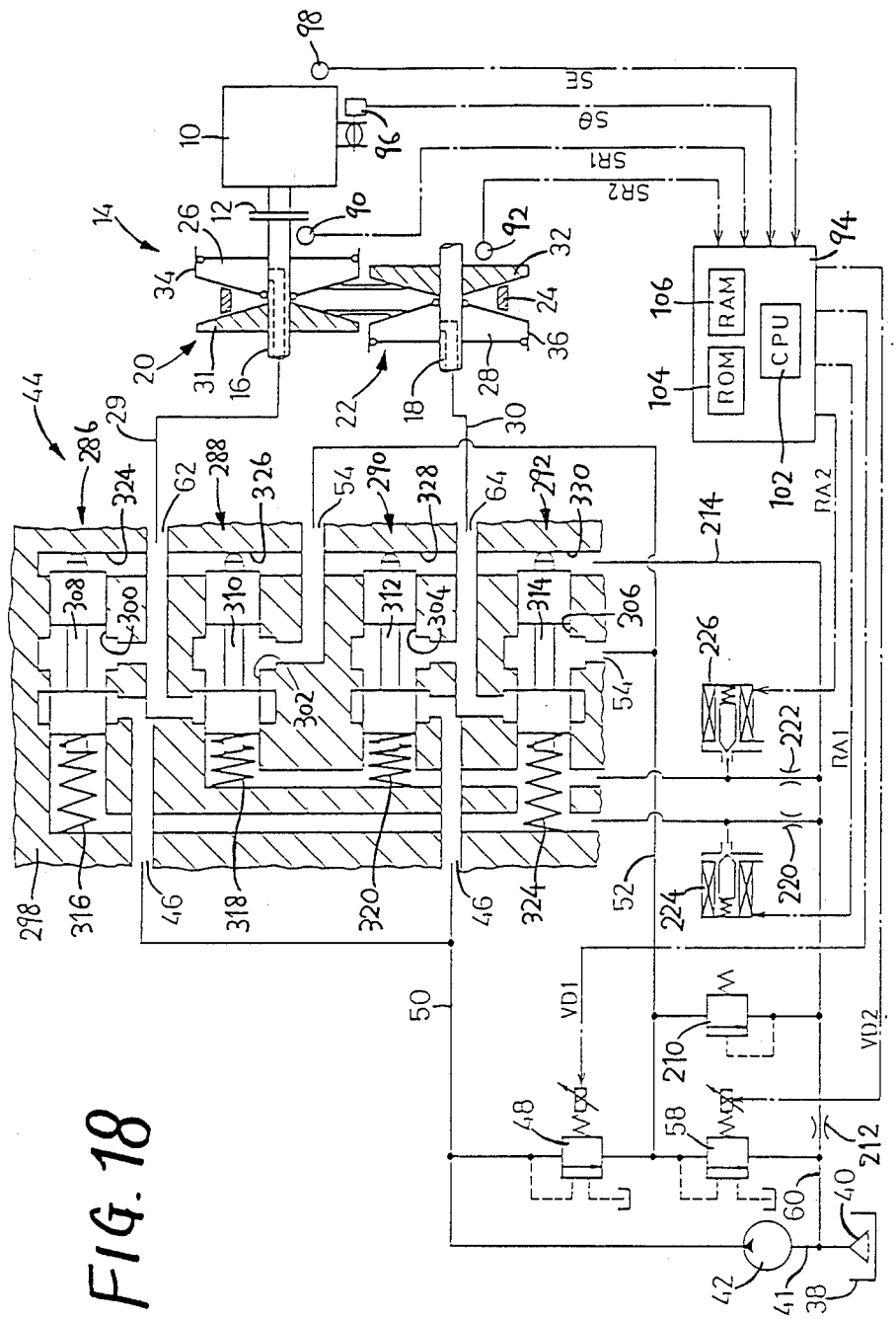

Referring next to FIG. 18, there is shown a further modified embodiment of the invention wherein the shift-control valve 44 uses four spools. Described in greater detail, the instant shift-control valve 44 includes a first spool valve 286, a second spool valve 288, a third spool valve 290, a fourth spool valve 292, a first pilot valve 224 for concurrently operating the first and fourth spool valves 286, 292, and a second pilot valve 226 for concurrently operating the second and third spool valves 288, 290.

The first, second, third and fourth spool valves 286, 288, 290, 292 have a first, a second, a third and a fourth spool 308, 310, 312, 314, respectively. These spools are slidably received in respective first, second, third and fourth cylinder bores 300, 302, 304 and 306 which are formed in parallel to each other in a valve body 298. The first, second, third and fourth spools 308, 310, 312 and 314 are axially biased by respective first, second, third and fourth springs 316, 318, 320 and 322, and are normally held in abutting contact with respective inner surfaces 324, 426, 328 and 330 each of which defines one axial end of the corresponding cylinder bore 300, 302, 304, 306. The abutment of the valve spools on the inner surfaces 324, 326, 328 and 330 establishes the neutral position of the shift-control valve 44, in which no output pressures are delivered from the valve 44, as described later. In this embodiment, the inner surfaces 324, 326, 328 and 330 function as stop members for positioning the valve spools 308, 310, 312 and 314 at their non-operated positions, i.e., for establishing their neutral positions.

When the first and second pilot valves 224, 226 are in the closed position, all of the spools 308, 310, 312 and 314 are placed in the neutral position, while being held in abutment on the respective inner surfaces 324, 326, 328 and 330 under the biasing action of the corresponding springs 316, 318, 320 and 322. In this neutral position of the shift-control valve 44, the first and second cylinders 26, 28 are disconnected from the first and second pressure lines 50, 52. When the first pilot valve 224 is opened with the first speed ratio signal RA1 applied thereto, the pilot pressure applied to the first and fourth spools 308, 314 through the flow restrictor 220 is released to a drain through the first pilot valve 224. As a result, the spools 308, 314 are moved against the biasing forces of the springs 316, 322, and the corresponding first and fourth spool valves 286, 292 are placed in their open position, whereby the speed ratio of the transmission 14 is increased. On the other hand, when the second pilot valve 226 is opened with the second speed ratio signal RA2 applied thereto, the second and third spool valves 288 and 290 are brought into their open position, whereby the speed ratio of the transmission 14 is decreased. In this embodiment, the first and second pilot valves 224, 226 are turned on and off with the speed ratio signals RA1, RA2, preferably in a manner so as to control the duty cycles of the solenoids. In the case where the duty cycle or duty factor of these pilot valves 224, 226 is controlled, the pilot pressure acting on the end of the valve spools 308, 310, 312, 314 on the side of the biasing springs is continuously varied in accordance with the controlled duty cycle. Namely, the axial position of the spools is continuously varied with the duty cycle of the corresponding pilot valve 224, 226. It will be understood from the above explanation that the pilot pressure source 210, 212, first, second, third and fourth springs 316, 318, 320, 322, and first and second pilot valves 224, 226 constitute actuator means for operating the valve spools 308, 310, 312 and 314.

Figure 19:
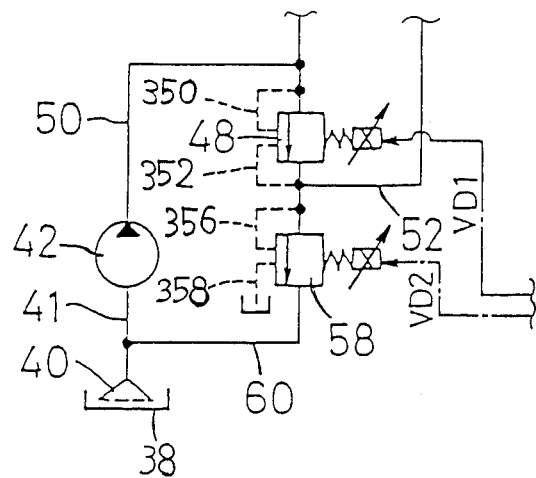
FIG. 19 is a fragmentary view of a further modified embodiment of the invention.

The first pressure regulating valve 48 may be operated based on the second line pressure as a reference pressure as indicated at 352 in FIG. 19. In this case, the first pressure regulating valve 48 consists of a spool valve 340, and a solenoid-operated linear pilot valve 342, as shown in detail in FIG. 20. The spool valve 340 includes a valve spool 344 for selective fluid communication between the first and second pressure lines 50, 52, and a spring 346 which biases the valve spool 344 in an axial direction toward its closed position in which the pressure lines 50, 52 are disconnected from each other. The pilot valve 342 generates a pilot pressure Pp which acts on the valve spool 344 in the biasing direction of the spring 346 so as to close the valve 340. The first line pressure Pl1 acts on the valve spool 344 in a direction opposite to the biasing direction of the spring 346, so as to open the valve 340. The neutral position of the valve spool 344 is determined by a point of equilibrium between a sum of the pilot pressure Pp and the biasing force of the spring 346, and the first line pressure Pl1.

The pilot valve 342 receives a first drive signal VD1 from the controller 94, to control the pilot pressure Pp according to the signal VD1, and thereby regulate the first line pressure Pl1. The pilot valve 342 is disposed between a pilot line 350 which is provided with a flow restrictor 348 and connected to the first pressure line 50, and a pilot drain line 352 connected to the second pressure line 52. In this arrangement, the pilot pressure Pp corresponding to the opening of the pilot valve 342 is obtained between the flow restrictor 348 and the pilot valve 342. The pilot valve 342 is drained through a reference pressure port 354 of the first pressure regulating valve 48 which is connected to the pilot drain line 352. In this arrangement, the pilot pressure Pp produced by the pilot valve 342 is determined by the pressure at the reference pressure port 354. Therefore, the first line pressure Pl1 regulated by the first pressure regulating valve 48 is determined based on the second line pressure Pl2. The pilot drain line 352 functions as a reference pressure line for applying the second line pressure as the reference pressure to the first pressure regulating valve 48. In the present embodiment, the second pressure regulating valve 58 is arranged similarly to the first pressure regulating valve 48. As indicated in FIG. 19, the second pressure regulating valve 58 is connected to the second pressure line 52 through a pilot line 356, and is connected to a drain or expose to the atmospheric pressure through a pilot drain line 358.

Figure 20:
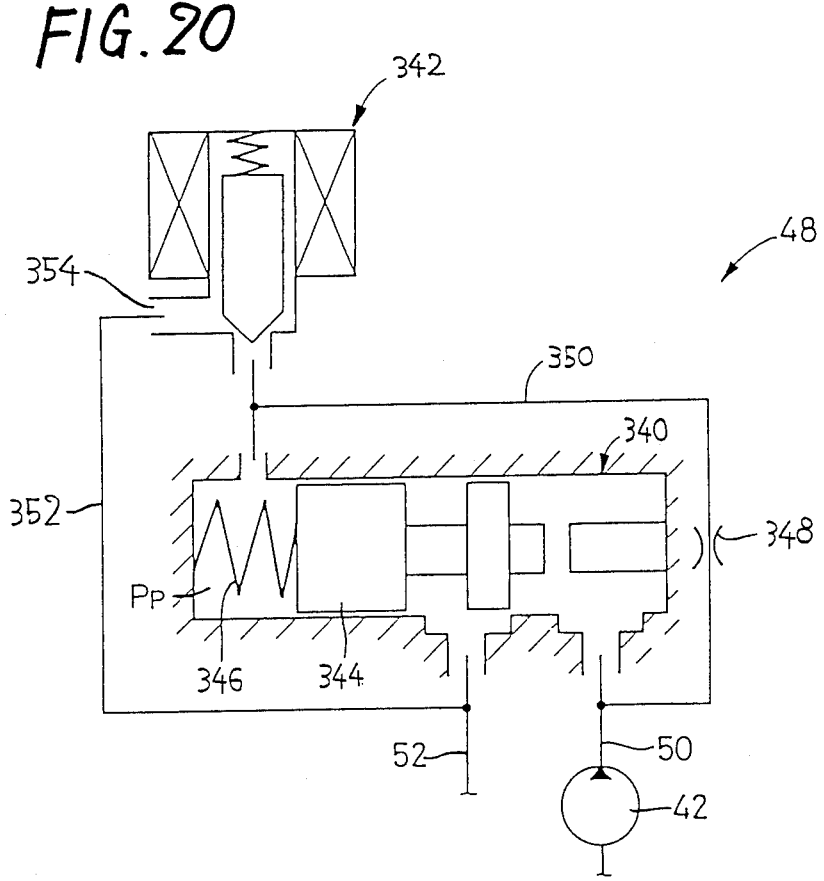
FIG. 20 is a view illustrating an arrangement of a first pressure regulating valve used in the embodiment of FIG. 19.

In the embodiment illustrated in FIGS. 19 and 20, the reference pressure port 354 of the first pressure regulating valve 48 is connected through the pilot drain line 352 to the second pressure line 52, so that the first line pressure Pl1 may be determined based on the second line pressure Pl2. This arrangement makes it possible to use the first and second pressure regulating valves 48, 58 which have the same specifications. The use of the same valves for the two valves 48, 58 leads to reducing the cost of the hydraulic system.

Figure 21:
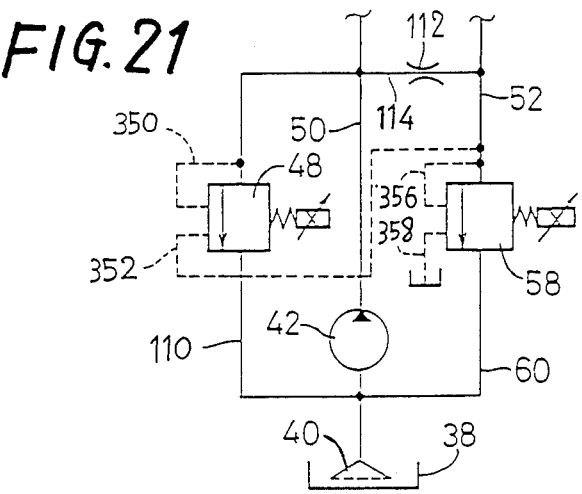
FIG. 21 is a view corresponding to that of FIG. 19, illustrating another embodiment of the invention.

Referring next to FIG. 21, there is shown another modified hydraulic control system for the transmission 14, wherein the first and second pressure regulating valves 48, 58 are disposed in parallel connection with each other. The first pressure line 50 is connected to the suction side of the oil pump 42 through the first pressure regulating valve 48 and the drain line 110, so that the fluid from the first pressure line 50 may be directly returned to the oil pump 42. The pressurized fluid from the oil pump 42 is also supplied to the second pressure line 52 through the line 114 equipped with the flow restrictor 112. The line 114 is provided to supply the second pressure regulating valve 58 with a sufficient amount of the fluid necessary to establish the second line pressure Pl2, and to provide a differential between the first and second line pressures Pl1 and Pl2. The second pressure regulating valve 58 is operated to regulate the pressure of the fluid from the line 114, and the fluid flowing from the first and second drain ports 54, 56 of the shift-control valve 44. The pilot drain line 352 is connected to the second pressure line 52, so that the second line pressure Pl2 is used by the first pressure regulating valve 48 as a reference for determining the first line pressure Pl1.

As in the preceding embodiment, the first and second line pressures Pl1 and Pl2 are suitably controlled, and the second line pressure Pl2 is applied to the first pressure regulating valve 48 as a reference pressure for regulating the first line pressure Pl1. Therefore, the first and second pressure regulating valves 48, 58 may have the same specifications.

Figure 22:
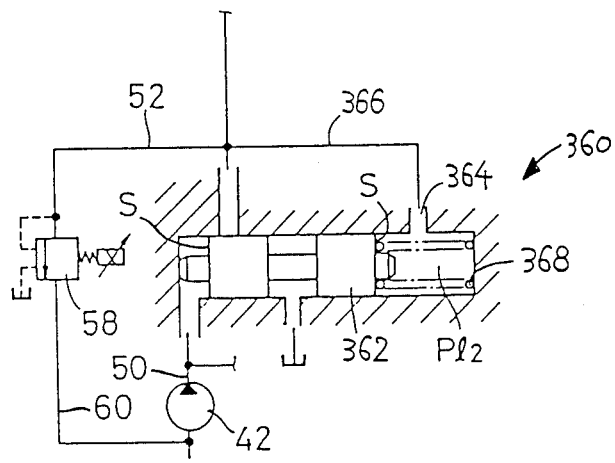
FIGS. 22, 23, 25 and 26 are views each corresponding to that of FIG. 20, depicting further embodiments of the present invention.
Figure 23:
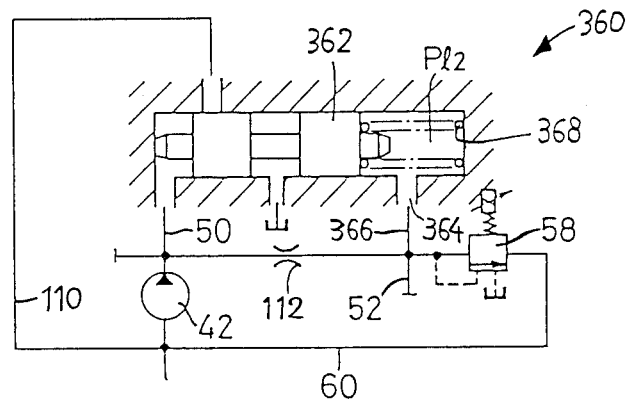
Figure 24:
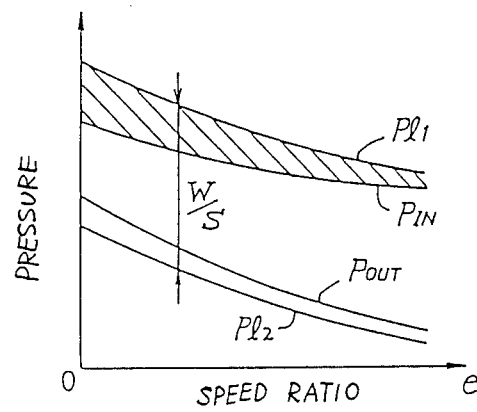
FIG. 24 is a view showing output characteristics of a first pressure regulating valve used in the embodiments of FIGS. 22 and 23.

The solenoid-operated first pressure regulating valve 48 may be replaced by hydraulically-operated valves 360 as depicted in FIGS. 22 and 23. The first pressure regulating valve 360 shown in FIG. 22 is disposed in series connection with the second pressure regulating valve 58. The first pressure regulating valve 360 shown in FIG. 23 is disposed in parallel connection with the second pressure regulating valve 58. The valve 360 has a valve spool 362 for fluid communiction of the first pressure line 50 with the second pressure line 52 or the drain line 110. The valve 360 further has a reference pressure port 364 for applying the second line pressure Pl2 to the valve spool 362 in a direction to close the valve, a line 366 for connecting the reference pressure port 364 and the second line pressure 52, and a spring 368 for biasing the spool 362 in a direction to close the valve. The first line pressure Pl1 applied to the spool 362 acts against the biasing force W of the spring 368 and the second line pressure Pl2. In this arrangement, the first line pressure Pl1 is determined as indicated in FIG. 24, when the valve spool 362 is placed at a point of equilibrium expressed by the following equation (25):

$$Pl1 = W/S + Pl2 \qquad (25)$$

where, W: biasing force of the spring 368,
S: areas of the spool 362 receiving the first and second line pressures Pl1 and Pl2.

It will be understood from the equation (25) that the first pressure line Pl1 established by the first pressure regulating valve 360 based on the second line pressure Pl2 is higher than the second line pressure Pl2 by a predetermined value equal to W/S. The line 366 functions as a reference pressure line for applying the second line pressure Pl2 to the first pressure regulating valve 360. The present embodiment eliminates steps S8-S10 of FIG. 2 for controlling the first pressure regulating valve 360, and consequently simplifies the control system, as well as provides the advantages offered by the preceding embodiments.

Figure 27:
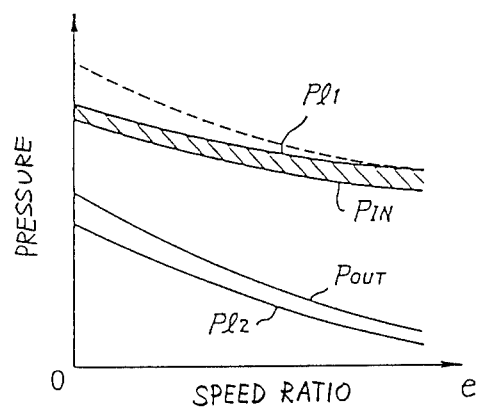
FIG. 27 is a view showing output characteristics of a first pressure regulating valve used in the embodiments of FIGS. 25 and 26.
Figure 25:
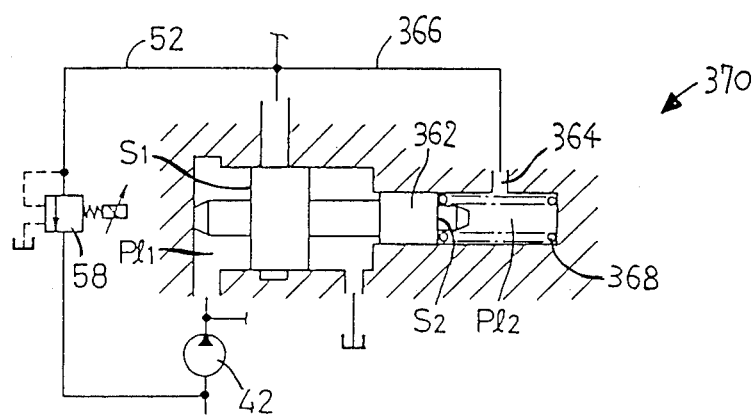
Figure 26:
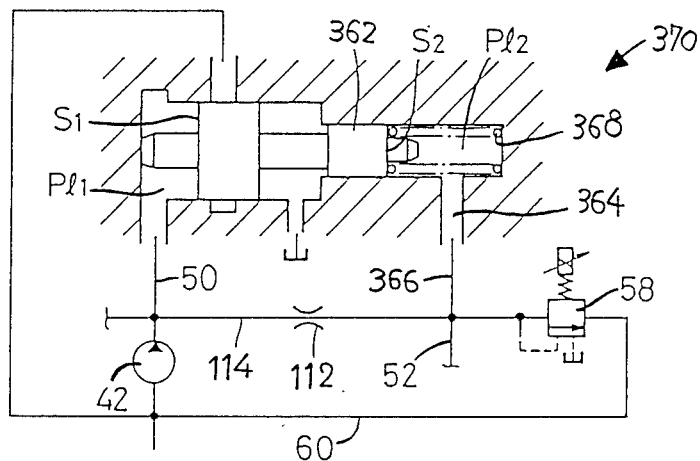

The first pressure regulating valves 360 of FIGS. 22 and 23 may be replaced by first pressure regulating valves 370 as shown in FIGS. 25 and 26. The valves 370 are basically identical in construction to the valves 360, except in that the valve 370 has different pressure receiving areas S1 and S2. More specifically, the first pressure receiving area S1 for receiving the first line pressure Pl1 is larger than the second pressure receiving area S2 for receiving the second line pressure Pl2. In this case, the point of equilibrium of the valve spool 362 is determined according to the following equation (26), and the first line pressure Pl1 is controlled as shown in FIG. 27.

$$Pl1 = W/S1 + Pl2 \cdot S2/S1 \qquad (26)$$

It will be understood from the equation (26) that the first pressure regulating valve 370 regulates the first line pressure Pl1 based on Pl2 multiplied by S2/S1, and that the regulated first line pressure Pl1 is higher than this reference pressure by an amount equal to W/S1. Thus, the present embodiments of FIGS. 25 and 26 have the same advantages as the preceding embodiments of FIGS. 22 and 23. Further, since the first and second pressure receiving areas S1 and S2 of the valve spool 362 are different, a surplus of the first line pressure Pl1 (established by the first pressure regulating valve 370) over the pressure (Pin or Pout) in the high-pressure cylinder (provided on the drive shaft) can be significantly reduced as shown in hatched lines in FIG. 27, as compared with that shown in FIG. 24, in the preceding embodiments. Accordingly, the power loss of the vehicle due to unnecessarily high pressure of the high-pressure cylinder can be minimized. Further, the instant hydraulically-operated pressure regulator valves 370 do not require an electric control as required where a solenoid-operated pressure relief valve is used for the first pressure regulating valve 48.

Figure 28:
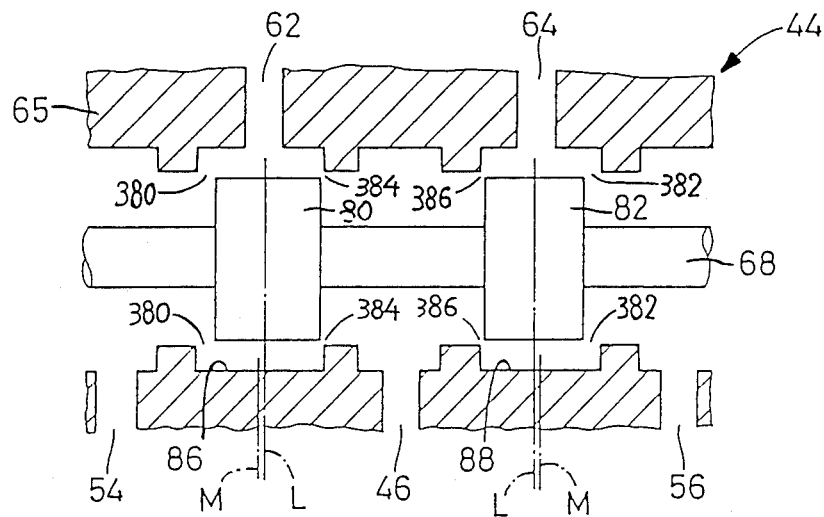
FIG. 28 is a fragmentary view in cross section of a shift-control valve used in a still further embodiment of the invention.

While the shift-control valve 44 shown in FIGS. 1 and 11, for example, has flow restrictors in the form of continuously variable clearances between the lands 80, 82, and the first and second annular grooves 86, 88, the shift-control valve 44 may be modified as shown in FIG. 28. In this modified arrangement, while the valve spool 68 is placed in its neutral position, the minimum area of flow through the valve 44 for permitting the fluid to be discharged from the first or second cylinder 26 28 is larger than that for permitting the fluid to be fed into the first or second cylinder 26, 28. Described in greater detail, the neutral position of the valve spool 68 is determined such that centerlines M of the annular grooves 86, 88 axially of the spool 68 are offset a suitable small distance from centerlines L of the lands 80, 82 in the axial directions toward the first and second solenoids 74, 76, respectively. Accordingly, clearances 380, 382 which allow restricted fluid flows from the first and second output ports 62, 64 to the first and second drain ports 54, 56 are larger than clearances 384, 386 that allow restricted fluid flows from the input port 46 to the first and second output ports 62, 64. The widths of the lands 80, 82 are smaller than the widths of the first and second annular grooves 86, 88, and the clearances 380, 382, 384, 86 are defined by distances between the end faces of the lands 80, 82, and the corresponding ends of the annular grooves 86, 88. Namely, the distances defining the clearances 380, 382 are greater than those defining the clearances 384, 386. However, the distances defining the clearances 384, 386 may be zero, or the cirmcumferential surface of the land 80, 82 may overlap a portion of the inner surface of the cylinder body 65 adjacent to the corresponding annular groove 86, 88. In either of these cases, small clearances 384, 386 are formed between the circumferential surface of the land 80, 82, and the inner surface of the body 65.

Figure 29:
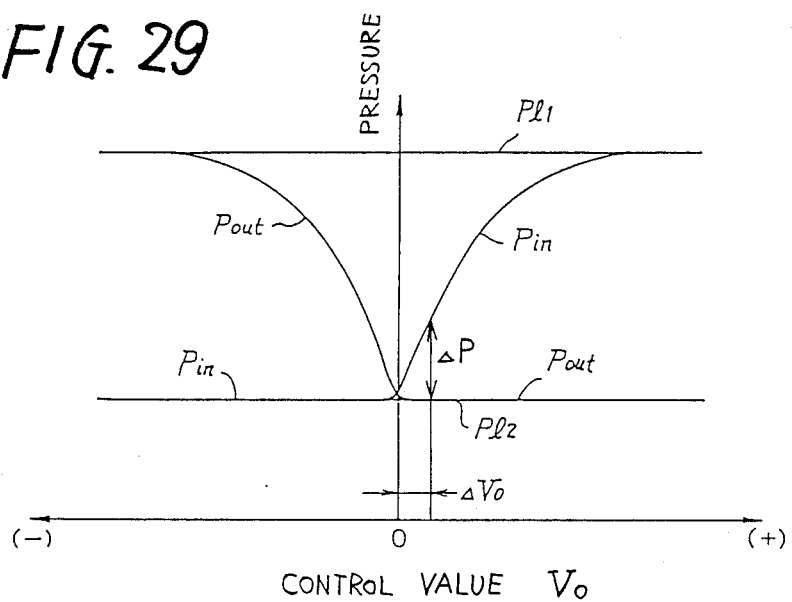
FIG. 29 is a view illustrating output characteristics of the shift-control valve of FIG. 28.

While the valve spool 68 of the thus arranged valve 44 is placed in its neutral position, the same pressures are delivered from the first and second output ports 62, 64. Since the clearances 380, 382 are larger than the clearances 384, 386, the output pressures from the output ports 62, 64 are influenced by the second line pressure Pl2 and are made substantially equal to this second line pressure Pl2. When the valve spool 68 is moved in an axial direction, for example, toward the second solenoid 76 (to the right in FIG. 28), the area of fluid flow between the first output port 62 and the first drain port 54 is continuously increased, and the first output port 62 is eventually maintained at the second line pressure Pl2. In the meantime, the area of fluid flow between the second output port 64 and the input port 46 is continuously increased, while the area of fluid flow between the second output port 64 and the second drain port 56 is continuously decreased. Consequently, the output pressure delivered from the second output port 64 to the second cylinder 28 is progressively elevated, finally to the first line pressure Pl1. Conversely, when the valve spool 68 is moved toward the first solenoid valve 74 (to the left in the figure), the area of fluid flow between the second output port 64 and the second drain port 56 is continuously increased, and the second output port 64 is eventually maintained at the second line pressure Pl2. In the meantime, the area of fluid flow between the first output port 62 and the input port 46 is continuously increased, while the area of flow between the first output port 62 and the first drain port 54 is continuously decreased. Accordingly, the output pressure delivered from the first output port 62 to the first cylinder 26 is progressively raised, finally to the level of the first line pressure P 1. FIG. 29 illustrates the output characteristics of the shift-control valve 44 operated as described above. In the graph, the horizontal axis represents a distance of movement of the valve spool 68 from the neutral position, that is, the control value Vo of the solenoids 74, 76.

According to the output characteristics of the shift-control valve 44 as illustrated in FIG. 29, the lower one of the output pressures from the first and second output ports 62, 64 is maintained at the second line pressure Pl2. Further, the output pressure is governed by the second line pressure Pl2 even when the spool 68 is in the neutral position. As a result, the pressure Pin or Pout in the low-pressure cylinder provided on the driven shaft, that is, the belt tension of the transmission, can be easily controlled, by means of adjusting the second line pressure Pl2, i.e., a lower pressure source by the second pressure regulating valve 58. Furthermore, even though the lower output pressure delivered from the first or second output port 62, 64, is held at the second line pressure Pl2 as mentioned above, the pressure Pin or Pout in the high-pressure cylinder may rapidly rise as the spool 68 moves past the neutral position, as shown in FIG. 29. This means a reduced speed-ratio control error ΔVo inherent in the solenoid 74, 76, as compared with a shift-control valve which uses flow restrictor passages.

Figure 30:
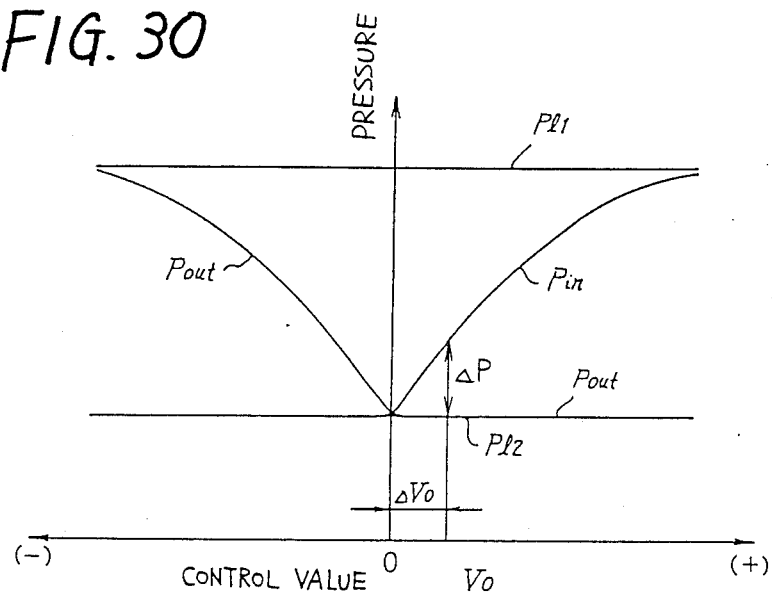
FIG. 30 is a view showing output characteristics of a shift-control valve where the drain port is connected to a hydraulic cylinder of the transmission through a flow restrictor.

In the embodiment shown in FIG. 29, the lower output pressure of the valve 44 is not maintained at the second line pressure Pl2 while the spool 68 is in the neutral position. This indicates a difficult control of the tension of the transmission belt 24. FIG. 30 shows output characteristics of a shift-control valve which uses flow restrictors connecting the drain ports 54, 56 and the cylinders 26, 28. In this example, the fluid is discharged from the cylinders through the restrictors, and therefore the higher output pressure (pressure Pin or Pout in the high-pressure cylinder on the drive shaft) rises comparatively slowly over the entire high-pressure range of the control value Vo. This indicates a relatively large speed-ratio control error ΔVo. The error ΔVo shown in FIG. 30 is obtained in the same condition as that shown in FIG. 29, namely, at the same pressure difference between the two output ports 62, 64 or same cylinder pressure difference (Pin - Pout) when the thrust forces of the two cylinders 26, 28 are in equilibrium to maintain a desired speed ratio of the transmission 14.

Figure 31:
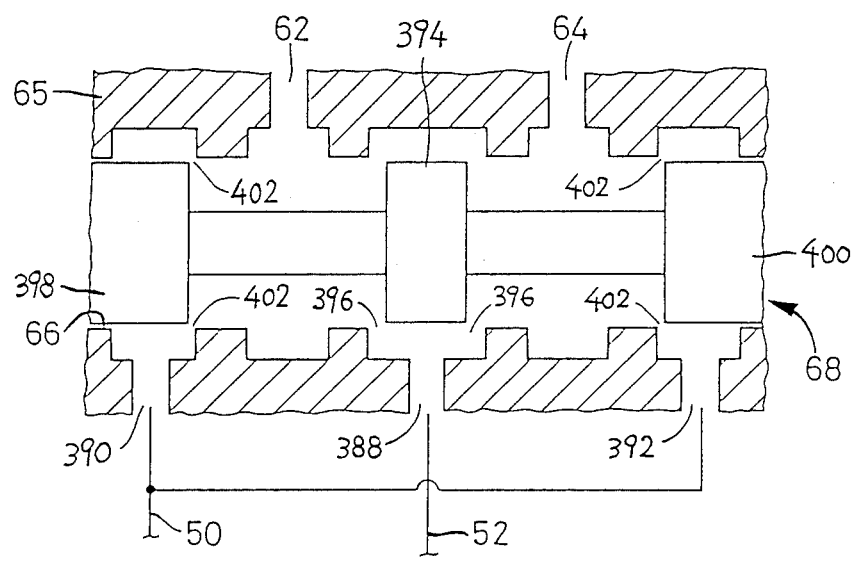
FIG. 31 is a view corresponding to that of FIG. 29, depicting a further embodiment of the invention.

The shift-control valve 44 may be modified as shown in FIG. 31, wherein the positions of the ports associated with the first and second line pressures Pl1 and Pl2 are different from those of the input and drain ports 6, 54, 56 in the preceding embodiments. More specifically, the second line pressure Pl2 is supplied to a drain port 88, while the first line pressure Pl1 is applied to a first and a second input port 390, 392. In this instance, the minimum area of fluid flow between the first and second output ports 62, 64, and the drain port 388, is larger than that between the first and second input ports 390, 392 and the first and second output ports 62, 64. In other words, while in the neutral position of the valve spool 68, clearances 396 between an intermediate land 394 of the spool 68 and the valve body 65 is larger than clearances 02 between lands 398, 400 of the spool 68 and the valve body 65. The instant shift-control valve 44 exhibits the same output characteristics, and provides the same advantages as the valve 44 of the preceding embodiment of FIG. 28.

Figure 32:
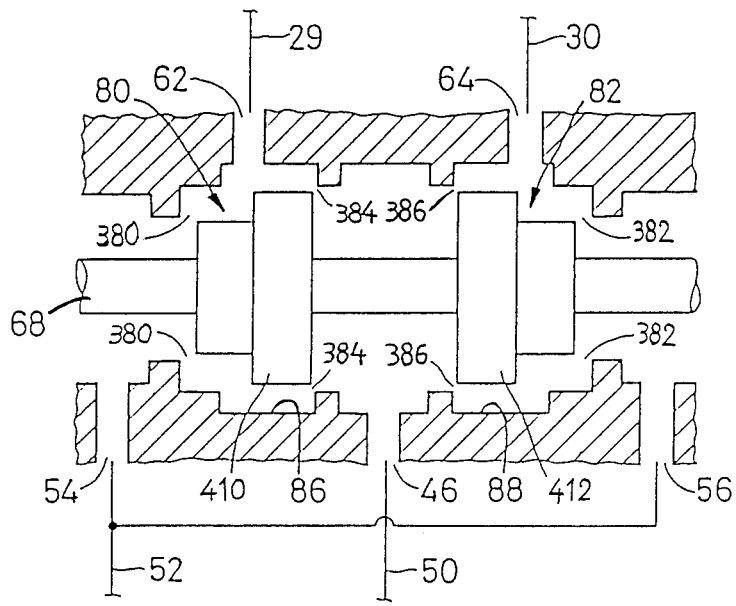
FIG. 32 is a view corresponding to that of FIG. 28, depicting another embodiment of the invention.

Referring to FIG. 32, there is depicted a further modification of the shift-control valve 44. In this valve 44, too, the area of flow of the fluid through the valve 44 in a direction from the first or second cylinder 26, 28 to the second pressure line 52 is larger than the area of flow of the fluid through the same valve 44 in a direction from the first pressure line into the cylinder 26, 28, when the valve spool 68 is placed in its neutral position. A difference of the instant shift-control valve 44 from those of the preceding embodiments of FIGS. 28 and 31 lies in that a rate of change in the area of flow of the fluid from the first pressure line 50 into each cylinder 26, 28 as the spool 68 is moved from the neutral position is made higher than that in the area of flow of the fluid from the cylinder 26, 28 into the second pressure line 52. Described in greater detail, clearances 380, 382 through which the fluid flows from the output ports 62, 64 toward the drain ports 54, 56 are larger than clearance 384, 386 through which the fluid flows from the input port 46 toward the output ports 62, 64. The clearances 380, 382, 384, 386 are determined by distances between the lands 80,882 and the ends of the annular grooves 86, 88, as previously discussed. That is, the distances defining the clearances 380, 382 are larger than the distance defining the clearances 384, 386. Each of the lands 80, 82 includes a large-diameter portion 410, 412 on the side nearer to the input port 46, and therefore has a larger cross sectional area on the side nearer to the input port 46. Accordingly, the area of flow of the fluid toward the cylinder 26, 28 is changed at a higher rate than that of the fluid from the cylinder toward the second pressure line 52, as the valve spool 68 is moved from the neutral position. Thus, the shift-control valve 44 exhibits the output characteristics in relation to the movements of the spool, as shown in FIG. 33.

Figure 33:
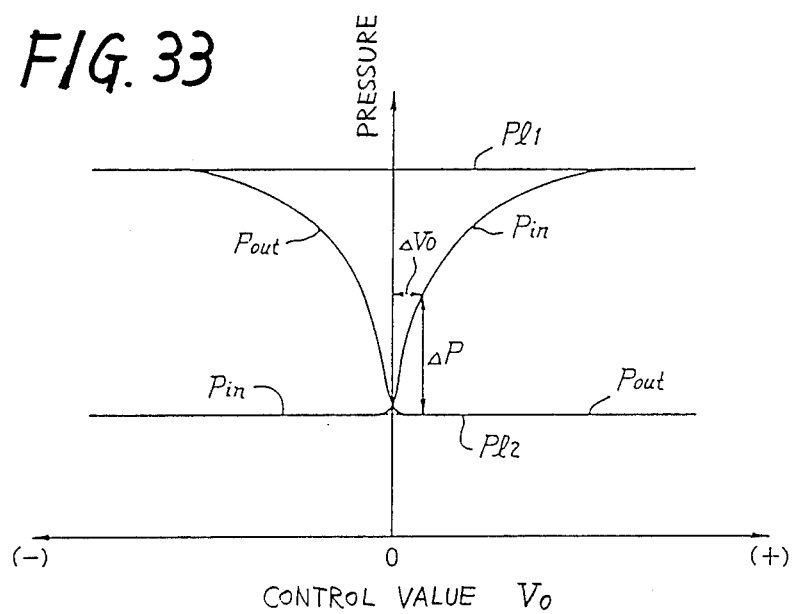
FIG. 33 is a view illustrating output characteristics of a shift-control valve used in the embodiment of FIG. 32.

In the present embodiment wherein the lands 80, 82 of the spool 68 have the large-diameter portion 410, 412 for a higher rate of change in the area of fluid flow into the cylinder than in the area of fluid flow out of the cylinder as the spool is moved, the higher output pressure from the first or second port 62, 64, i.e., the pressure Pin or Pout in the high-pressure cylinder (on the drive shaft) can be raised at a higher rate, as indicated in the graph of FIG. 33. In addition, when the spool 68 is in the neutral position, the output pressures from the output ports 62, 64 are governed by the second line pressure Pl2, and therefore the pressure in the low-pressure cylinder is maintained at the second line pressure Pl2. According to the instant arrangement, a rate of change in the higher output pressure according to a distance of movement of the valve spool 68, in other words, a gain of the shift-control valve 44 according to a change in the control value Vo, is made relatively high, whereby the speed-ratio control error ΔVo can be minimized. Further, since the lower one of the output pressures delivered from the output ports 62, 64 is maintained at the second line pressure Pl2, the pressure Pin or Pout in the low-pressure cylinder (on the driven shaft), and the tension of the transmission belt 24, can be easily adjusted by regulating the second line pressure Pl2 by means of the second pressure regulating valve 58.

Figure 34:
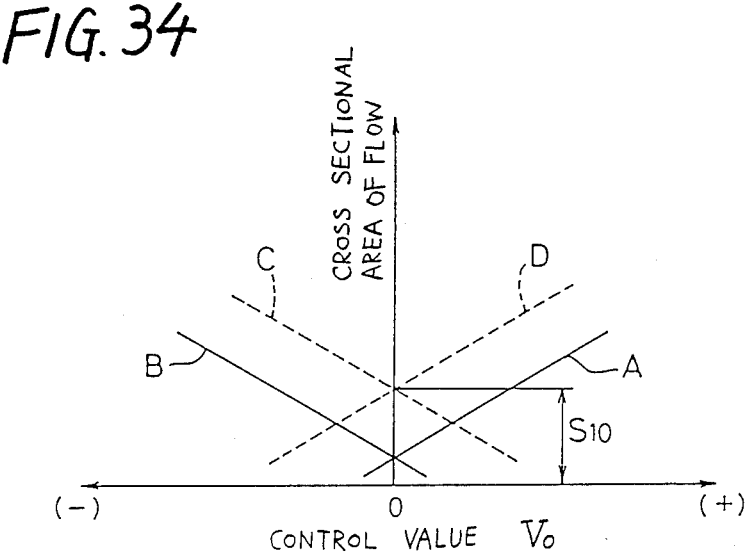
FIG. 34 is a view representing changes in the cross sectional area of fluid flow through the shift-control valve whose output characteristics is shown in FIG. 29.
Figure 35:
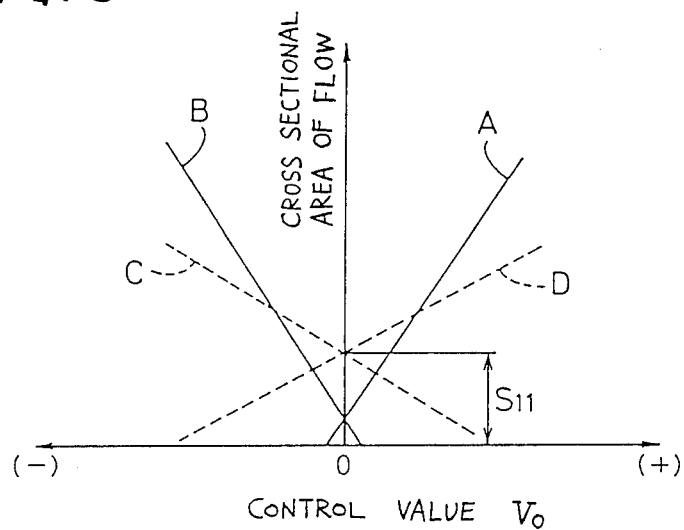
FIG. 35 is a view representing changes in the cross sectional area of fluid flow through the shift-control valve whose output characteristics is shown in FIG. 33.

The rate of rise of the higher output pressure of the instant shift-control valve 44 is higher than that shown in FIG. 29 of the preceding embodiment in which the lands 80, 82 do not have large-diameter portions. The error $\Delta$Vo shown in FIG. 33 is obtained in the same condition as those shown in FIGS. 29 and 30, namely, at the same pressure difference between the two output ports 62, 64 or same cylinder pressure difference $\Delta$P (Pin - Pout) when the thrust forces of the two cylinders 26, 28 are in equilibrium to maintain a desired speed ratio of the transmission 14. The output characteristics of the instant valve 44 shown in FIG. 33 is derived from a difference of the rate of change in the area of fluid flow through the valve 44 for supplying the fluid into the cylinder, from that for discharging the fluid from the same cylinder. In the case of FIG. 29, the area of flow of the fluid into the cylinder 26, 28 is increased at the same rate as the area of flow of the fluid out of the same cylinder, as indicated in FIG. 34. In the present case of FIG. 33, on the contrary, the areas of flow of the fluid into and out of the cylinder 26, 28 are increased at different rates, as indicated in FIG. 35. In these figures, line "A" represents a minimum area of fluid flow from the input port 46 to the first output port 62, while line "B" represents a minimum area of fluid flow from the input port 46 to the second output port 64. Similarly, line "C" represents a minimum area of fluid flow from the first output port 62 to the first drain port 54, while line "D" represents a minimum area of fluid flow from the second output port 64 to the second drain port 56. As is understood from FIG. 35, the rate of increase in the area of fluid flow into the cylinder (angle of inclination of the lines "A" and "B") is higher (larger) than the rate of increase in the area of fluid flow from the cylinder (angle of inclination of the lines "C" and "D"). Area Sll (in cross section) of fluid flow between the drain ports 54, 56 and the output ports 62, 64 while in the neutral position of the valve spool 68 is so determined as to maintain the pressure in low-pressure cylinder at the second line pressure Pl2. This value Sll is determined depending upon the various parameters of the continuously variable transmission 14, and is equal to S10 indicated in FIG. 34.

Figure 36:
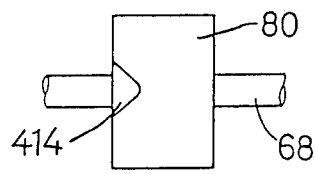
Figure 37:
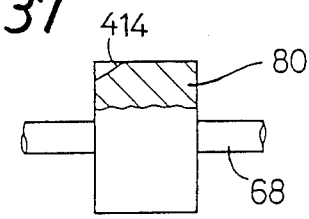
FIGS. 37 and 38 are fragmentary views showing still further modified embodiments of the invention, FIG. 36 being a front elevation of a valve spool of a shift-control valve, FIG. 37 being a front elevation in cross section of a valve spool in a plane including its axis, and FIG. 38 being an elevational view in transverse cross section of valve.
Figure 38:
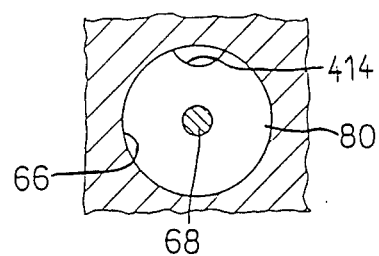

While the shift-control valve 44 of the preceding embodiment is provided with the output characteristics shown in FIG. 33 by forming the lands 80, 82 of the spool 68 with the large-diameter portions 410, 412, it is possible to form notches 414 in a portion of each land 80, 82 on the side of the first or second drain port 54, 56 as shown in FIGS. 36, 37 and 38. These notches 414 function to reduce the rate of change in the area of fluid flow on the corresponding side of the lands 80, 82. Therefore, the rate of change in the area of fluid flow on the other side of the lands is relatively increased.

Figure 39:
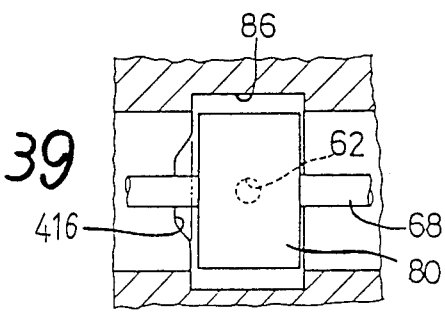
FIGS. 39-42 are views corresponding to that of FIG. 32, illustrating yet further embodiments of the invention.
Figure 40:
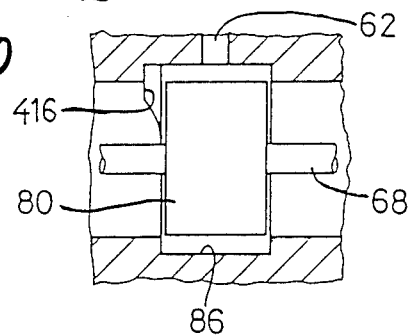

Alternatively, the first and second annular grooves 86, 88 formed in the inner surface of the cylinder bore 66 may be provided with recesses 416 on the side of the drain port 54, 56, as illustrated in FIGS. 39 and 40, so that the recesses 416 reduce the rate of change in the area of fluid flow from the cylinder and thereby relatively increase that in the area of fluid flow into the cylinder.

Figure 41:
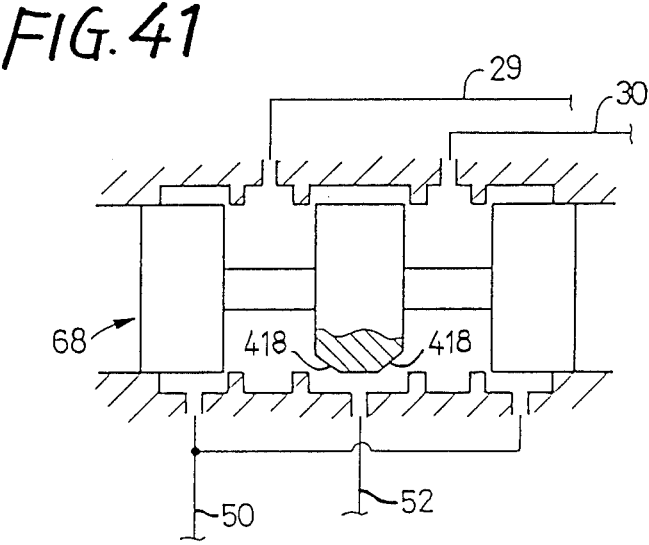
Figure 42:
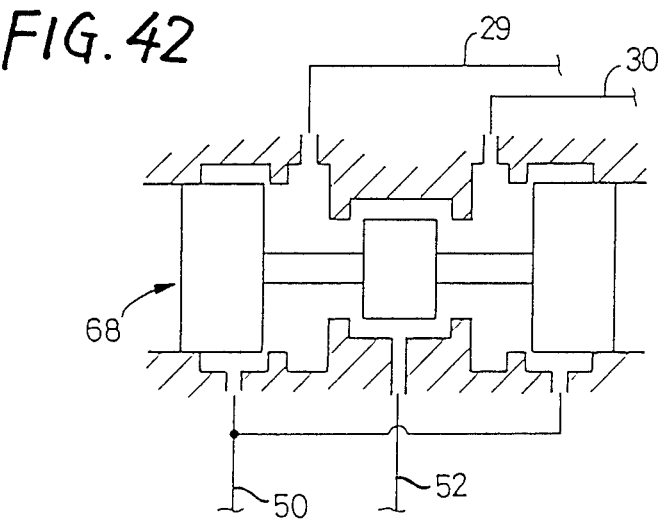

Further modified forms of the shift-control valve 44 are shown in FIGS. 41, 42, wherein the second pressure line 52 is connected to a port which is formed at the same position as the input port 46 of the preceding embodiments, and the first pressure line 50 is connected to ports which are located at the same positions as the first and second drain ports 54, 56 of the preceding embodiments. In this case, the valve spool 68 has three lands. In the spool 68 of FIG. 41, the intermediate land has notches or chambers 418. In the spool of FIG. 42, the two outer lands have a larger diameter than the intermediate land. Thus, the rate of change in the area of fluid flow toward the cylinder is made higher than the rate of change in the area of fluid flow from the cylinder.

While the present invention has been described in its preferred embodiments with a certain degree of particularity, it is to be understood that the invention may be otherwise embodied.

For example, the first and second hydraulic cylinders 26, 28 of the transmission 14 which have the same pressure receiving areas, may be modified to have different pressure receiving areas.

Since the second pressure regulating valve 58 is provided to regulate the relatively lower one of the pressures of the two cylinders 26, 28, different control formulas for the second pressure regulating valve 58 are preferably used for the first and second cylinders 26, 28. In the embodiment of FIG. 1, however, the control accuracy of the valve 58 is not significantly lowered, because the first and second cylinders 26, 28 have the same pressure receiving areas. In this case, steps S7 and S9 of FIG. 2 may be replaced by a single step which is executed before step S6. Although steps S7 and S9 differ from each other in the compensation for a centrifugal pressure, the rotating speed Nout of the second shaft 18 may be used commonly for the equations (4) and (10), since the vehicle is running in the positive-torque state.

While the constants k1, k2, k3 and k4 are used in steps S12 and S13 of FIG. 2, these constants may be replaced by functions of the transmission speed ratio e, engine output torque Te, engine speed Ne, or vehicle speed V.

In the embodiment of FIG. 1, the shift-control valve 44 is controlled so that the actual speed ratio e coincides with the determined target speed ratio e*, the valve 44 may be controlled so that the actual speed Nin of the first shaft 16 coincides with the target speed Nin* obtained in step S3, or so that the actual drive force of the vehicle coincides with a currently required output of the engine.

Although the shift-control valve 44 of FIG. 1, for example, is provided with the first and second solenoids 74, 76, these solenoids may be replaced by other forms of electromagnetic actuators such as stepper motors.

The shift-control valve 44 of the embodiment of FIG. 17 may be modified, such that the end of the valve spool 244 on the side of the inner surface 274 of the valve body 65 is exposed to the atmosphere, while the spring 250 is disposed on the inner surface 274 in order to bias the valve spool 244 toward the end remote from the inner surface 274. In this case, the operations of the first and second solenoid-operated pilot valves 224, 226, and the first and second spool valves 270, 272, are reversed to those described in connection with this embodiment.

In the embodiment of FIG. 28, the clearance 380 in the shift-control valve 44 is larger than the clearance 384, and at the same time the clearance 382 is larger than the clearance 386, while the spool 68 with the lands 80, 82 is placed in its neutral position. However, it is possible that the clearance 382 is larger than the clearance 386, but the clearance 380 is equal to the clearance 384. In this case, too, the principle of the invention is practiced to some extent.

In the embodiment of FIG. 28, both of the two lands 80, 82 of the spool 68 of the shift-control valve 44 have the large-diameter portion 410, 412. However, only one of the two lands 80, 82, for example, only the land 82 has the large-diameter portion 410. In this case, different rates of change in the areas of fluid flows are obtained only in connection with the land 82, but the principle of the invention is practiced in some degree.

In the embodiments of FIGS. 28 and 32, the clearances 380, 382, 384, 386 are defined by distances between the end faces of the lands 80, 82 and the corresponding ends of the annular grooves 86, 88, it is possible that the clearances 380, 382 are defined by such distances, while the clearances 384, 386 are defined by distances of overlap between the lands 80, 82 and the portions of the valve body 65 adjacent to the grooves 86, 88.

It is to be understood that the present invention is not limited to the details of the illustrated embodiments, but various other changes and modifications may be made in the invention, without departing from the spirit and scope of the invention defined in the following claims.

What is claimed is:

1. A hydraulic control system for a continuously variable transmission of a belt-and-pulley type for an automotive vehicle, the transmission having a first and a second shaft, a first and a second variable-diameter pulley provided on the first and second shafts, respectively, a transmission belt connecting the first and second pulleys to transmit power from one of the pulleys to the other, and a first and a second hydraulic cylinder for changing effective diameters of the first and second pulleys, said hydraulic control system comprising:
   a hydraulic pressure source for pressurizing a working fluid;
   a first pressure regulating valve for regulating the pressure of the pressurized fluid delivered from said hydraulic pressure source, and thereby establishing a first line pressure;
   a shift-control valve for applying said first line pressure to one of said first and second hydraulic cylinders, while simultaneously permitting a flow of the fluid from the other hydraulic cylinder, thereby changing the effective diameters of said first and second pulleys to control a speed ratio of said transmission; and
   a second pressure regulating valve for regulating the pressure of a discharge flow of the fluid flowing from said other hydraulic cylinder through said shift-control valve, and thereby establishing a second line pressure which is lower than said first line pressure.

2. A hydraulic control system according to claim 1, wherein said shift-control valve includes:
   a cylinder body having a cylinder bore, a first and a second output port communicating with said cylinder bore, and with said first and second hydraulic cylinders, respectively, an input port communicating with the cylinder bore and receiving said first line pressure, and a drain port communicating with the cylinder bore;
   a valve spool slidably received within said cylinder bore;
   biasing means for normally holding said valve spool in a neutral position; and
   an electromagnetic actuator operable for moving said valve spool away from said neutral position,
   said valve spool when placed in said neutral position permitting restricted flows of the fluid between said first and second output ports, and said input and drain ports, with slight areas of communication therebetween,
   a movement of said valve spool from said neutral position in an axial direction thereof causing an increase in an area of communication between one of said first and second output ports and said input port, a decrease in an area of communication between said one output port and said drain port, a decrease in an area of communication between the other of said first and second output ports and said input port, and an increase in an area of communication between said other output port and said drain port.

3. A hydraulic control system according to claim 1, wherein said shift-control valve has a valve spool, and said hydraulic control system further comprises:
   a pilot pressure source for generating a pilot pressure for operating said valve spool of said shift-control valve; and
   a solenoid-operated pilot valve device operable for controlling a level of said pilot pressure to be applied to said valve spool, and thereby controlling a position of said valve spool.

4. A hydraulic control system according to claim 3, wherein said shift-control valve includes a cylinder body having a cylinder bore in which said valve spool is slidably received, said cylinder body cooperating with pressure-receiving surfaces of said valve spool at opposite axial ends thereof, to define a first and a second pilot pressure chamber which are fluid-tightly formed at opposite ends of said cylinder bore, said first and second pilot pressure chambers receiving said pilot pressure so that the pilot pressure acts on said pressure-receiving surfaces of the valve spool, said pilot valve device being turned on and off with a controlled duty ratio to control the level of said pilot pressure to be supplied to said first and second pilot pressure chambers.

5. A hydraulic control system according to claim 3, wherein said pilot pressure source comprises a pressure reducing valve and a flow restrictor in series connection with said pressure reducing valve, said pressure relief valve and said flow restrictor being disposed between a drain line, and one of a first and a second pressure line from which said first and second line pressures are obtained, said pilot pressure being produced from between said pressure reducing valve and said flow restrictor.

6. A hydraulic control system according to claim 3, wherein said pilot pressure source comprises a third pressure regulating valve disposed in a line into which the fluid flows from one of said first and second pressure regulating valves, said third pressure regulating valve regulating a pressure of said fluid flowing from said one of the first and second pressure regulating valves, as said pilot pressure.

7. A hydraulic control system according to claim 1, wherein said shift-control valve includes:

a valve body having a pair of cylinder bores;

a pair of valve spools axially slidably received within said cylinder bores, respectively;

a pair of stop members for limiting axial movements of said valve spools through abutting contact with the valve spools, respectively, and thereby determining neutral positions of said valve spools; and actuator means for axially moving said valve spools, and thereby controlling flows of the fluid into said one hydraulic cylinder and from said other hydraulic cylinder.

8. A hydraulic control system according to claim 7, wherein said actuator means comprises a pair of springs for biasing said pair of valve spools axially toward said stop members, a pair of cores fixedly engaging said pair of valve spools, and a pair of coils disposed around said pair of cores to produce electromagnetic forces to move said cores and thereby directly move said pair of valve spools against the biasing action of said pair of springs.

9. A hydraulic control system according to claim 7, further comprising a pilot pressure source for generating a pilot pressure applied to said pair of valve spools, said actuator means comprising a pair of springs for biasing said pair of valve spools axially toward said stop members, and a pair of solenoid-operated pilot valves for controlling said pilot pressure and thereby controlling the axial movements of the valve spools against the biasing action of said pair of springs.

10. A hydraulic control system according to claim 7, wherein one of said pair of valve spools permits a flow of the fluid into said first hydraulic cylinder, and a flow of the fluid from said second hydraulic cylinder, the other valve spool permitting a flow of the fluid into said second hydraulic cylinder and a flow of the fluid from said first hydraulic cylinder, said first shaft being connected to an engine of the vehicle.

11. A hydraulic control system according to claim 1, wherein said shift-control valve includes:

a valve body having four parallel cylinder bores;

four valve spools axially slidably received within said cylinder bores, respectively;

four stop members for limiting axial movements of said valve spools through abutting contact with the valve spools, respectively, and thereby determining neutral positions of said valve spools; and actuator means for axially moving said valve spools, and thereby controlling flows of the fluid into said one hydraulic cylinder and from said other hydraulic cylinder.

12. A hydraulic control system according to claim 11, wherein said four valve spools consist of a first spool for permitting a flow of the fluid to said first hydraulic cylinder, a second spool for permitting a flow of the fluid from said first hydraulic cylinder, a third spool for permitting a flow of the fluid to said second hydraulic cylinder, and a fourth spool for permitting a flow of the fluid from said second hydraulic cylinder.

13. Hydraulic control system according to claim 11, further comprising a pilot pressure source for generating a pilot pressure applied to said four valve spools, said actuator means comprising four springs for biasing said four valve spools axially toward said stop members, and a pair of solenoid-operated pilot valves for controlling said pilot pressure and thereby controlling the axial movements of the valve spools against the biasing action of said four springs.

14. A hydraulic control system according to claim 13, wherein said four valve spools consist of a first, a second, a third and a fourth spool, each of which is exposed at opposite axial ends to said pilot pressure, one of said pair of pilot valves concurrently controlling the pilot pressures which act on said first and fourth spools in a biasing direction of the corresponding springs, the other of said pilot valves concurrently controlling the pilot pressures which act on said second and third spools in a biasing direction of the corresponding springs.

15. A hydraulic control system according to claim 1, further comprising a second pressure line from which said second line pressure is obtained, and a reference pressure line connected to said second pressure line, and wherein said first pressure regulating valve comprises a reference pressure port which is connected to said reference pressure line to receive said second line pressure as a reference pressure on which said first line pressure is regulated by said first pressure regulating valve.

16. A hydraulic control system according to claim 15, further comprising a first pressure line from which said first line pressure is obtained, and a pilot line provided with a flow restrictor and connected to said first pressure line, and wherein said first pressure regulating valve includes:

a solenoid-operated linear pilot valve connected between said pilot line and said reference pressure line, to receive the fluid from said first pressure line through said flow restrictor and release a portion of the received fluid into said reference pressure line through said reference pressure port, thereby producing a continuously variable pilot pressure between the pilot valve and said flow restrictor; and a valve spool operable between a closed position, and an open position for fluid communication of said first pressure line with said second pressure line or a drain line, said pilot pressure acting on said valve spool to move the valve spool in a direction toward said closed position.

17. A hydraulic control system according to claim 15, further comprising a first pressure line from which said first line pressure is obtained, and wherein said first pressure regulating valve includes:

a valve spool operable between a closed position, and an open position for fluid communication between said first pressure line with said second pressure line or a drain line, said valve spool having a first and a second pressure receiving surface, said first line pressure acting on said first pressure receiving surface of said valve spool in a direction to move said valve spool toward said open position, said second line pressure supplied through said reference pressure line acting on said second pressure receiving surface of said valve spool in a direction to move the valve spool toward said closed position; and a spring for biasing said valve spool in a direction toward said closed position.

18. A hydraulic control system according to claim 1, further comprising a first and a second pressure line from which said first and second line pressures are obtained, respectively, and wherein said first pressure regulating valve includes a valve spool operable between a closed position, and an open position for fluid communication of said first pressure line with said second pressure line or a drain line, said valve spool having a first and a second pressure receiving surface which have different areas, said first line pressure acting on said first pressure receiving surface of said valve spool in a direction to move said valve spool toward said open position, said second line pressure supplied through said second pressure line acting on said second pressure receiving surface of said valve spool in a direction to move the valve spool toward said closed position, said first pressure regulating valve being operable to release a portion of the fluid received from said hydraulic pressure source through said first pressure line, into said second pressure line, thereby producing said second line pressure in said second pressure line.

19. A hydraulic control system according to claim 18, wherein said first pressure regulating valve further includes a spring which biases said valve spool in a direction toward said closed position.

20. A hydraulic control system according to claim 18, wherein said second pressure receiving surface of said valve spool of the first pressure regulating valve has a smaller area than said first pressure receiving surface.

21. A hydraulic control system according to claim 1, further comprising a first and a second pressure line from which said first and second line pressures are obtained, respectively, and wherein an area of flow of the fluid through said shift-control valve in a direction from each of said first and second hydraulic cylinders toward said second pressure line is larger than an area of flow of the fluid through said shift-control valve in a direction from said first pressure line toward said each hydraulic cylinder, at least while said shift-control valve is placed in a neutral position thereof.

22. A hydraulic control system according to claim 21, wherein said shift-control valve includes a valve body having a cylinder bore 66, and a valve spool slidably received within said cylinder bore and having two lands, and wherein while said valve spool is placed in a neutral position thereof, one of said two lands and said cylinder bore cooperating to define a first clearance communicating with said first pressure line, and a second clearance communicating with said second pressure line, and the other of said two lands and said cylinder bore cooperating to define a third clearance communicating with said first pressure line, and a fourth clearance communicating with said second pressure line, said second and fourth clearances being larger than said first and third clearances, respectively.

23. A hydraulic control system according to claim 21, wherein said shift-control valve includes a valve body having a cylinder bore 66, and a valve spool slidably received within said cylinder bore and having a first, a second and a third land, said first land being disposed between said second and third lands, and wherein while said valve spool is placed in a neutral position thereof, said first and second lands and said cylinder bore cooperating to define a first clearance communicating with said first pressure line, and a second clearance communicating with said second pressure line, and said first and third lands and said cylinder bore cooperating to define a third clearance communicating with said first pressure line, and a fourth clearance communicating with said second pressure line, said second and fourth clearances being larger than said first and third clearances, respectively.

24. A hydraulic control system according to claim 1, further comprising a first and a second pressure line from which said first and second line pressures are obtained, respectively, and wherein a rate of change in an area of fluid flow through said shift-control valve in a first direction from said first pressure line toward each of said first and second hydraulic cylinders as said shift-control valve is operated from a neutral position thereof, is higher than a rate of change in an area of fluid flow through said shift-control valve in a second direction from said each hydraulic cylinder toward said second pressure line.

25. A hydraulic control system according to claim 24, wherein said shift-control valve includes a valve body having a cylinder bore, and a valve spool which is slidably received within said cylinder bore and has a plurality of lands, each of said lands having a first portion which cooperate with said cylinder bore to define a first clearance through which the fluid flows from said each hydraulic cylinder to said second pressure line, and a second portion which cooperates with said cylinder bore to define a second clearance through which the fluid flows from said first pressure line to said each hydraulic cylinder, said first portion of said each land having a smaller cross sectional area, than said second portion.

26. A hydraulic control system according to claim 24, wherein said area of fluid flow through said shift-control valve in said second direction is larger than said area of fluid flow through said shift-control valve in said first direction, while said shift-control valve is placed in a neutral position thereof.

27. A hydraulic control system according to claim 26, wherein said shift-control valve includes a valve body having a cylinder bore, and a valve spool which is slidably received within said cylinder bore and has a plurality of lands, each of said lands cooperating with said cylinder bore to define a first clearance communicating with said first pressure line, and a second clearance communicating with said second pressure line, said second clearance being larger than said first clearance while said valve spool is placed in a neutral position thereof.

* * * * *